United States Patent
Buckley et al.

(10) Patent No.: US 6,551,107 B1
(45) Date of Patent: Apr. 22, 2003

(54) SYSTEMS AND METHODS FOR WEB-BASED LEARNING

(75) Inventors: Ralph S. Buckley, Culpeper, VA (US); Lawrence W. Gimple, Charlottesville, VA (US)

(73) Assignee: Cardioconcepts, Inc., Charlottesville, VA (US)

( * ) Notice: Subject to any disclaimer, the term of this patent is extended or adjusted under 35 U.S.C. 154(b) by 0 days.

(21) Appl. No.: 09/704,842

(22) Filed: Nov. 3, 2000

(51) Int. Cl.[7] .............................................. G09B 23/28
(52) U.S. Cl. ........................ 434/262; 434/267; 434/272
(58) Field of Search .................. 434/262, 263, 434/264, 265, 266, 267, 268, 269, 270, 271, 272, 273, 274, 275; 707/500.1; 345/636

(56) References Cited

U.S. PATENT DOCUMENTS

| | | | |
|---|---|---|---|
| 5,395,243 A | 3/1995 | Lubin et al. ................. | 434/118 |
| 5,421,730 A | 6/1995 | Lasker, III et al. ......... | 434/118 |
| 5,437,554 A | 8/1995 | Clark et al. ................. | 434/322 |
| 5,535,422 A | 7/1996 | Chiang et al. .............. | 395/155 |
| 5,537,618 A | 7/1996 | Boulton et al. ............. | 395/161 |
| 5,720,007 A | 2/1998 | Hekmatpour ................ | 395/54 |
| 5,788,508 A | 8/1998 | Lee et al. .................... | 434/350 |
| 5,791,907 A | 8/1998 | Ramshaw et al. .......... | 434/262 |
| 5,800,178 A * | 9/1998 | Gillio .......................... | 434/262 |
| 5,806,056 A | 9/1998 | Hekmatpour ................ | 706/50 |
| 5,813,863 A | 9/1998 | Sloane et al. ............... | 434/236 |
| 5,820,386 A | 10/1998 | Sheppard, II ............... | 434/322 |
| 5,822,745 A | 10/1998 | Hekmatpour ................ | 706/59 |
| 5,823,781 A | 10/1998 | Hitchcock et al. .......... | 434/118 |
| 5,867,821 A * | 2/1999 | Ballantyne et al. ......... | 345/970.1 |
| 5,904,485 A * | 5/1999 | Siefert ......................... | 434/236 |
| 5,915,971 A * | 6/1999 | Ramsay et al. ............. | 434/276 |
| 5,934,909 A | 8/1999 | Ho et al. ..................... | 434/362 |
| 5,934,910 A | 8/1999 | Ho et al. ..................... | 434/362 |
| 5,974,412 A | 10/1999 | Hazlehurst et al. ........... | 707/3 |
| 5,974,446 A | 10/1999 | Sonnenreich et al. ........ | 709/204 |
| 5,987,473 A | 11/1999 | Jorgensen ................... | 707/104 |
| 5,991,595 A | 11/1999 | Romano et al. ............ | 434/353 |
| 5,991,735 A | 11/1999 | Gerace ......................... | 705/10 |
| 6,021,404 A | 2/2000 | Moukheibir ................. | 706/46 |
| 6,024,577 A | 2/2000 | Wadahama et al. ......... | 434/322 |
| 6,029,159 A | 2/2000 | Zorba et al. ................. | 706/47 |
| 6,032,141 A | 2/2000 | O'Connor et al. ........... | 706/45 |
| 6,039,575 A | 3/2000 | L'Allier et al. ............. | 434/323 |
| 6,052,676 A | 4/2000 | Hekmatpour ................ | 706/11 |
| 6,062,862 A | 5/2000 | Koskinen .................... | 434/107 |
| 6,288,753 B1 * | 9/2001 | DeNicola et al. ........... | 348/586 |
| 6,330,575 B1 * | 12/2001 | Moore et al. ................ | 707/513 |
| 6,338,149 B1 * | 1/2002 | Ciccone, Jr. et al. ......... | 714/38 |
| 2001/0053513 A1 * | 12/2001 | Corn et al. .................. | 434/350 |

OTHER PUBLICATIONS

"Seeking Jefferson at: University of Virginia", Feb. 18, 1997, Pilot Online–Travel, http://www.pilotonline.com/travel/jefferson/uva.html.*

Crowley, "College vs. Internet", Eagle–Tribune, Jan. 25, 1999, http://www.eagletribune.com/news/stories/19990125/FP_002.htm.*

"A Walk through Time", NIST Physics Laboratory, Jul. 2000, http://physics.nist.gov/time.*

* cited by examiner

*Primary Examiner*—John Edmund Rovnak
(74) *Attorney, Agent, or Firm*—Harrity & Snyder, L.L.P.

(57) ABSTRACT

A system provides medical training over a network. The system receives a medical topic indication, retrieves at least one graphical user interface related to the medical topic, and provides the retrieved graphical user interface over the network to a user.

5 Claims, 26 Drawing Sheets

SYSTEMS AND METHODS FOR WEB-BASED LEARNING

FIELD OF THE INVENTION

The present invention relates generally to networks and, more particularly, to systems and methods for providing a web-based training environment.

BACKGROUND OF THE INVENTION

In the field of medicine, information changes rapidly, and new products and procedures are continuously being developed to improve patient care. As a result, it is very important for medical professionals to keep abreast of the latest products and procedures.

In today's fast-paced society, medical professionals often do not have the time to attend conferences or lectures regarding these new developments. Therefore, there exists a need for systems and methods that allow medical professionals to obtain credible, cutting-edge information so that they may apply these advances to their practices.

SUMMARY OF THE INVENTION

Systems and methods, consistent with the present invention, address this and other needs by providing medical training via a network, such as the Internet.

In accordance with the purpose of the invention as embodied and broadly described herein, a system provides medical training over a network. The system includes a memory and a processor. The memory is configured to store graphical user interfaces relating to medical topics. Each graphical user interface includes one or more questions. The processor receives a medical topic indication, retrieves at least one graphical user interface related to the medical topic, and provides the retrieved at least one graphical user interface over the network to a user.

In a further implementation consistent with the present invention, a method provides medical educational credits. The method includes receiving, from the user, an indication of a medical topic of interest; transmitting, by the server, medical questions related to the topic to the user; receiving answers to the questions from the user; determining the user's understanding of the medical topic based on the answers; and providing medical educational credits to the user based on the determining.

In yet a further implementation consistent with the present invention, a computer-readable medium contains a hierarchical data structure. The hierarchical data structure includes exercise fields, where each exercise field is configured to store one or more of questions, answers, and statements relating to a first level educational topic; seminar fields, where each seminar field relates to a second level educational topic and groups one or more of the exercise fields based on the second level educational topic; one or more learning pavilion fields, where each learning pavilion field relates to a third level educational topic and groups one or more seminar fields based on the third level educational topic; and one or more college fields, where each college field relates to a fourth level educational topic and groups one or more learning pavilion fields based on the fourth level educational topic.

In still a further implementation consistent with the present invention, a system for displaying images is provided. The system includes a memory and a processor. The processor receives a request for a web page from a user device. The web page is associated with at least one image and a textual description of the at least one image. The processor causes the web page and textual description to be displayed on the user device, retrieves the at least one image, and causes the at least one image to be displayed on the user device in the location of the textual description.

In yet another implementation consistent with the present invention, a system for creating a medical training program is provided. The system includes a server and an authoring device. The server stores medical imagery objects, transmits one or more graphical user interfaces, receives at least one lesson relating to a medical topic, and creates a medical training program using the at least one lesson. The authoring device receives the one or more graphical user interfaces, creates the at least one lesson using the graphical user interfaces, where the at least one lesson includes at least one question or statement and is associated with at least one of the medical imagery objects, and transmits the at least one lesson to the server.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 8–18 illustrate exemplary graphical user interfaces, consistent with the present invention, that may be provided to the user of an authoring device;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods, consistent with the present invention, provide an interactive educational environment by which users may keep abreast of the latest information in a particular area of interest. Creation of the interactive educational environment is simplified by allowing for remote authoring of lesson plans and exercises. While the foregoing description is directed toward a medical training environment, the present invention is not so limited. In fact, systems and methods, consistent with the present invention, are equally applicable to any type of learning environment.

Exemplary System

Figure 1:
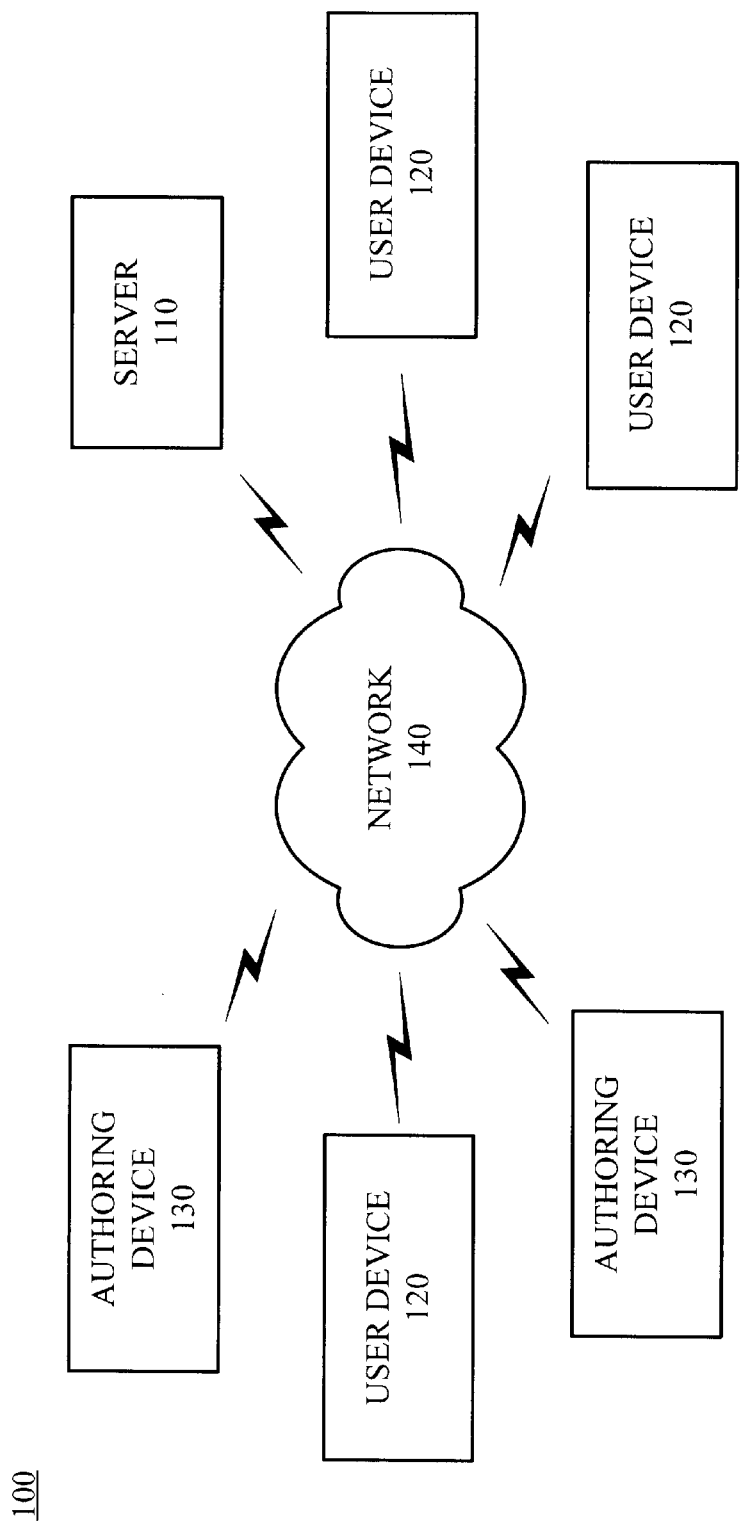
FIG. 1 illustrates an exemplary system in which systems and methods, consistent with the present invention, may be implemented.

FIG. 1 illustrates an exemplary system 100 in which systems and methods, consistent with the present invention, may be implemented. In FIG. 1, system 100 includes a server 110, user devices 120, authoring devices 130, and a network 140. The number of devices illustrated in FIG. 1 is provided for simplicity. A typical system 100 may include more or less servers 110, user devices 120, authoring devices 130, and networks 140.

The server 110 may include one or more types of computer systems, such as a mainframe, minicomputer, or personal computer, capable of connecting to the network 140 to enable server 110 to communicate with the user devices 120 and authoring devices 130. In alternative implementations, the server 110 may include a mechanism for directly connecting to one or more user devices 120 or authoring devices 130. The server 110 may transmit data over network 140 or receive data from the network 140 via a wired, wireless, or optical connection. As will be described in detail below, the server 110 provides, through the use of one or more web sites, an interactive medical training environment by which users may keep abreast of the latest information in the area of medicine and may, for example, obtain educational or continuing educational credits.

The user devices 120 may include any type of computer system, such as a mainframe, minicomputer, personal computer, laptop, personal digital assistant, or the like, capable of connecting to the network 140. As will be described in more detail below, the user devices 120 interact with the server 110 to provide users, via one or more graphical user interfaces, with medical training in the form of lesson plans. Like the server 110, the user devices 120 may transmit data over the network 140 or receive data from the network 140 via a wired, wireless, or optical connection.

The authoring devices 130 may include any type of computer system, such as a mainframe, minicomputer, personal computer, laptop, personal digital assistant, or the like, capable of connecting to the network 140. As will be described in more detail below, the authoring devices 130 interact with the server 110 to allow authors to create and/or modify the lessons provided to the users of user devices 120. The authoring devices 130 allow authors to designate their intellectual property, write medical lessons, review lesson content with medical editors, observe their medical lessons in the context of medical imagery, and "approve" their final content. This type of authoring network allows for extensive review of developed materials, thereby ensuring the medical integrity of all medical content and educational programming. The authoring devices 130 allow authors to input content and interact with editors remotely thereby obviating the need for local content providers and allowing continuous growth of the authoring network. The authoring devices 130 may transmit data over the network 140 or receive data from the network 140 via a wired, wireless, or optical connection.

The network 140 may include one or more conventional networks, such as the Internet, an intranet, a local area network (LAN), a metropolitan area network (MAN), a wide area network (WAN), and the like. In fact, the network 140 may include any type of network or combination of networks that permits routing of information from a particular source to a particular destination.

Exemplary Server Configuration

Figure 2:
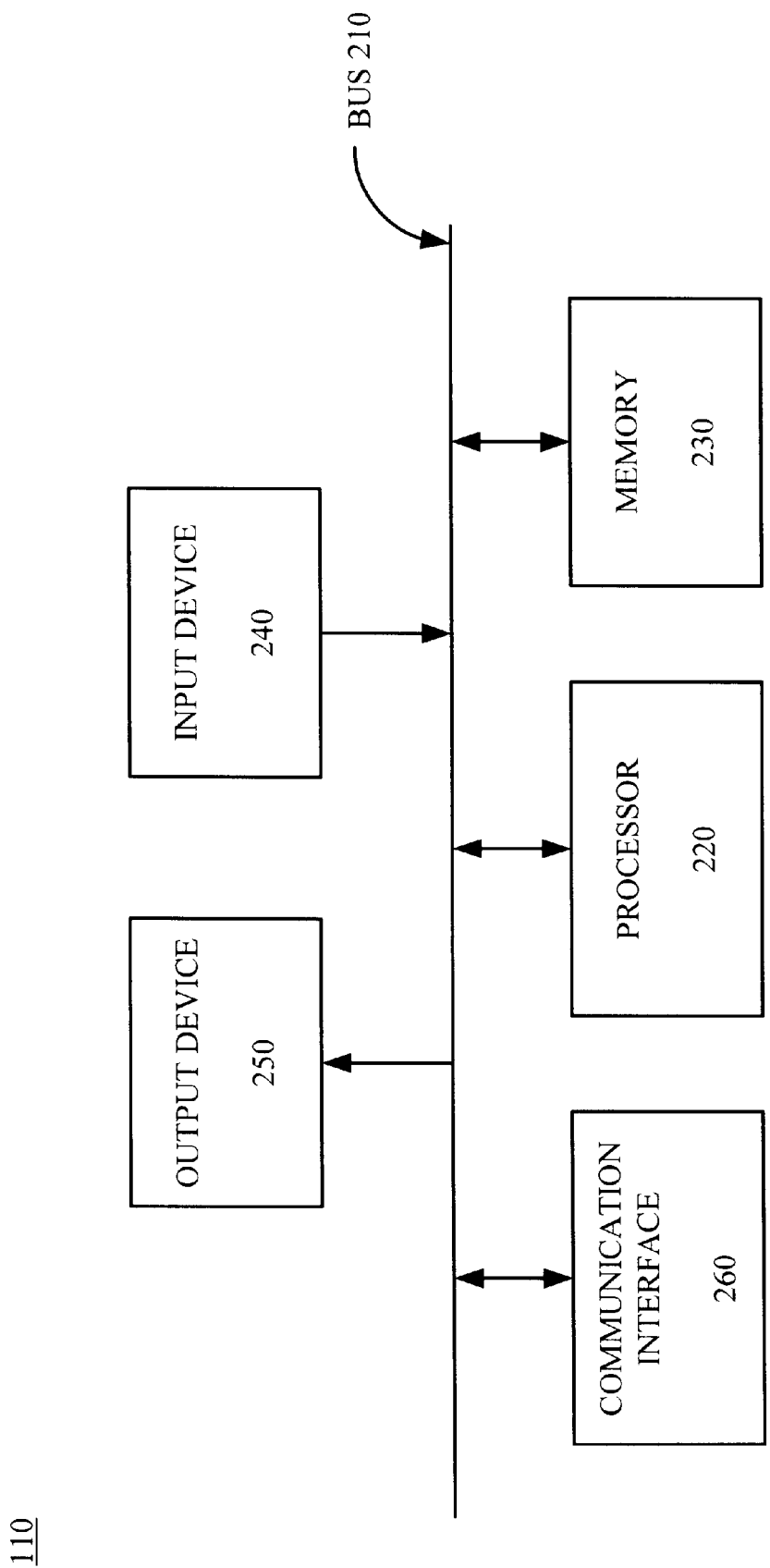
FIG. 2 illustrates an exemplary server configuration consistent with the present invention.

FIG. 2 illustrates an exemplary server 110 configuration consistent with the present invention. As illustrated, the server 110 may include a bus 210, a processor 220, a memory 230, an input device 240, an output device 250, and a communication interface 260. The bus 210 may include one or more conventional buses that permit communication among the components of the server 110.

The processor 220 may include any type of conventional processor or microprocessor that interprets and executes instructions. The memory 230 may include a random access memory (RAM) or another type of dynamic storage device that stores information and instructions for execution by the processor 220; a read only memory (ROM) or another type of static storage device that stores static information and instructions for use by the processor 220; and/or some type of magnetic or optical recording medium and its corresponding drive.

The input device 240 may include one or more conventional mechanisms that permit an operator to input information to the server 110, such as a keyboard, a mouse, a pen, voice recognition and/or biometric mechanisms, and the like. The output device 250 may include one or more conventional mechanisms that output information to the operator, including a display, a printer, a speaker, etc. The communication interface 260 may include any transceiver-like mechanism that enables the server 110 to communicate with other devices and/or systems. For example, the communication interface 260 may include mechanisms for communicating with the user devices 120 and authoring devices 130 via a network, such as network 140 (FIG. 1).

Execution of the sequences of instructions contained in a computer-readable medium, such as memory 230, causes processor 220 to perform the acts described below. It should be understood that a computer-readable medium may include one or more memory devices and/or carrier waves. Such instructions may be read into memory 230 from another computer-readable medium or from a separate device via communication interface 260. In alternative embodiments, hard-wired circuitry may be used in place of or in combination with software instructions to implement the present invention. Thus, the present invention is not limited to any specific combination of hardware circuitry and software.

The server 110, consistent with the present invention, may provide information from one or more associated databases to a graphical user interface at the user devices 120 or authoring devices 130. The databases may be stored at the server 110 (e.g., in memory 230 ) or externally from server 110.

Figure 3:
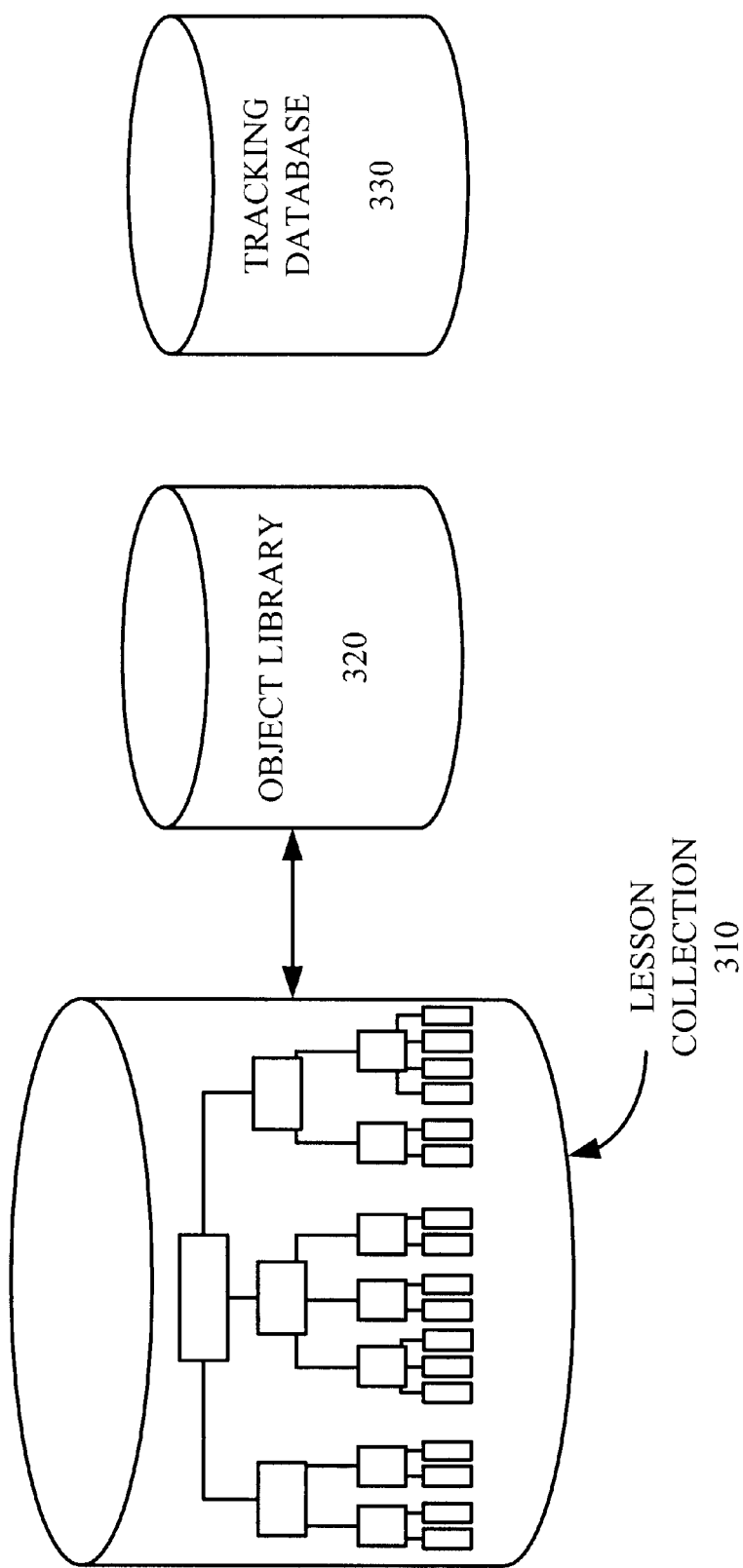
FIG. 3 illustrates exemplary databases, consistent with the present invention, that may be associated with the server of FIG. 2.

FIG. 3 illustrates exemplary databases 310–330, consistent with the present invention, that may be associated with server 110. While only three databases are described below, it will be appreciated that the server 110 may be associated with one or more additional databases (not shown) stored locally at server 110 or distributed throughout the network 140.

As illustrated, the databases include a lesson collection database 310, an object library database 320, and a tracking database 330. The lesson collection database 310 may store one or more hierarchical lesson plans that are linked to various multimedia objects in the object library 320 to allow for creation of complex lessons with multiple hierarchical levels. The lesson collection may include the following exemplary, hierarchical levels: Colleges, Pavilions, Seminars, Tutorials, Exercises, Questions, and Answers. Colleges may have Pavilions associated therewith; Pavilions may have Seminars associated therewith; and Seminars may have Tutorials associated therewith or may be directly related to an Exercise. This unique Seminar::Exercise relationship allows for Seminars to be directly related to Exercises until the number of Exercises builds up and then requires subdivision into groups of Exercises which will be called "Tutorials."

Each record within the lesson collection database 310 may include the following exemplary fields: a unique number field, a parent number field, a level field, a rank field, an object number field, a group of text fields, and an access level field. The unique number field may include a number that is unique to the particular record. The unique record number may be unique across all levels in the database 310. The parent number field may include an identifier that refers back to the next highest level to which the record is associated. For example, the Pavilion level may have a record called "Echocardiography Pavilion" that has a parent, "CardioVillage," and children at the Seminar level called "Pretest," "Tutorial," "Literature," etc. The parent number field simplifies the implementation of a hierarchical system within lesson collection database 310.

The level field may include an indication of the level associated with the particular record. A level indication of, for example, a 1 may represent the College level, a 2 may represent the Pavilion level, a 3 may represent the Seminar level, a 4 may represent the Tutorial level, a 5 may represent the Exercise level, a 6 may represent the Question level, and a 7 may represent the Answer level. The rank field may include a real number that determines the order in which the record will be displayed to a user. The object number field may include an object identifier that identifies an object in the object library database 320.

The text fields may have different functions depending upon the level of the record to which they are associated. Table I illustrates exemplary text fields that may be associated with records within the lesson collection database 310.

tion database 310 may include multiple pavilion records. The parent number field of each pavilion record may be set to the unique number of the parent CardioVillage record.

The Seminar level of the lesson collection database 310 may include records having a level equal to 3. The number of seminars may vary in implementations consistent with the present invention. For simplicity, it is assumed that six seminars exist. Therefore, six records at the Seminar level may be associated with each pavilion record. The parent number field of each of these six records would be set to the unique number of the parent Pavilion record. In text field 1, the six records may include data indicating the following exemplary seminar names: PreTest, Tutorials, Cases, Literature, BoardReview, and PostTest. Other Seminar names may alternatively be used. The records may also include a numerical indication in text field 2 to allow coding at the database level for indicating the type of seminar a record represents. For example, a "1" may represent a PreTest, a "2" may represent Tutorials, a "3" may represent Cases, and so on.

The Tutorial level includes records with a level equal to 4. The Tutorial level is an optional level that may be used to group exercises into more defined categories within Seminars. Text field 1 of a record in the Tutorial level may include the name of the Tutorial. The parent number field of the records in the Tutorial level may be set to the unique number of the parent Seminar record.

The Exercise level includes records with a level equal to 5. The Seminar-level Pretest records, which have text field 2 equal to 1, may include one or more Exercise-level records related to it by parent number and a group of pretest questions. The Tutorials records, which have text field 2 equal to 2, may have multiple Exercise-level records related to it by parent number and may contain questions, statements, and/or answers making up a "Tutorial."

The Cases records, which have text field 2 equal to 3, may have multiple Exercise-level records related to it by parent number and questions, statements, and/or answers making up a "Case." The Literature records, which have text field 2 equal to 4, may have multiple Exercise-level records related to it by parent number and may contain questions, statements, and/or answers making up a "Literature Lesson." The BoardReview records, which have text field 2 equal to 5, may have one or more exercise records related to it by

TABLE I

Definition of Text Fields in lesson record

|       | College         | Pavilion         | Seminar        | Tutorial        | Exercise        | Question              | Answer              |
|-------|-----------------|------------------|----------------|-----------------|-----------------|-----------------------|---------------------|
| Text1 | College Name    | Pavilion Name    | Seminar Name   | Tutorial Name   | Exercise Name   | Question text         | choice              |
| Text2 | —               | —                | 1-6            | —               | —               | Question or Statement | Answer/ Response    |
| Text3 | —               | —                | —              | —               | —               | Disclaimer            | 0 or 1 correct      |
| Text4 | —               | —                | —              | —               | —               | Tricorder             | —                   |
| Text5 | —               | —                | —              | —               | —               | Placeholder inspector | —                   |

In the College level (i.e., level=1), text field 1 may include the name of the college. In an implementation consistent with the present invention, text field 1 may include the name "CardioVillage." Children of this record are defined as those records that have level=2. As described above, level 2 represents the Pavilion level. In the Pavilion level, text field 1 may include the name of the pavilion. The lesson collecparent number and may contain one or more questions, each of which may be an individual "Board Review Type" question. The PostTest records, which have text field 2 equal to 6, may have one or more exercise records related to it by parent number and may contain one or more questions, making up a "Post Test."

The Question level includes records with a level equal to 6. Text field 1 of question records may include the text of the problem to which questions will be directed. Text field 2 may include an actual question or statement to be displayed and/or an object number of an object in object library database 320 that is to be displayed. Questions may be of a multiple choice type format. Text field 3 may include a disclaimer that is to be displayed with the question or statement. Text field 4 may include a statement, referred to as a "tricorder," that reminds the user of the problem in which the question is directed. Text field 5 may include a placeholder inspector. These inspectors act to display a text-based description of an object that is planned, but has not yet been processed. Text field 5 may include the text-based description of the object to be displayed.

The Answer level includes records with a level equal to 7. Text field 1 of answer records may include an answer choice, text field 2 may include the answer or response (i.e., the response that should be displayed if the choice is selected), and text field 3 may include an indication of whether the corresponding answer choice is correct or incorrect. Text field 3 may represent an incorrect answer with a 0 and a correct answer with a 1.

Each record may also be associated with an Access level field. The Access level field may include a variable that indicates when a particular record is to be displayed. At session initiation, an access level value may be determined based on user input. This value may then be compared to the value stored in the access level field to determine whether access to the record should be granted.

The object library database 320 may store a group of medical objects that can be integrated into the lesson plans of the lesson collection database 310. The object library database 320 manages the imagery data and questions that are used as teaching aids during instruction. Specifically, lessons may include questions, answers, and statements. These questions, answers, and statements may be associated with imagery and/or other data. Each type of imagery and data is classified as an "object type" and each object type has characteristics that are used to store and display the items on the web.

Each object may have object-specific characteristics associated with it, such as date of creation, person responsible for creating the object, object type, web availability, copyright status, lessons that use the object, projects in which the object is used, etc. Each object may be associated with multiple views. For example, a 12-lead electrocardiogram may include an image of the electrocardiogram, as well as 12 separate images corresponding to each of the 12 leads. Additionally, the single electrocardiogram may include an interpretation movie that includes voiceover, annotations, the individual leads, and any other element that is required for interpretation of the image. Each electrocardiogram object may also include such information as intervals, axes, interpretation information, specifications about each graphical element, a general description of the findings or diagnosis, and other relevant clinical information. Such a database configuration allows objects to be displayed over the network (e.g., on the Internet) in a dynamic manner with a minimum amount of code.

The server 110 may be associated with one or more tools, referred to hereinafter as "inspectors," that allow objects from object library database 320 to be viewed in greater detail. Five such inspectors include an electrocardiogram (ECG) inspector, a literature inspector, a placeholder inspector, a slide inspector, and a single inspector. The ECG inspector may allow the user to view the 12-lead electrocardiogram, to zoom in on the 12-lead electrocardiogram, to view the individual leads, an interpretation movie, or other clinically relevant information about the specific electrocardiogram.

The literature inspector may allow the user to view a summary of a journal article or clinical trial. The user may view a brief summary or expand the summary to include each element of the journal article or clinical trial, including graphical material. Additionally, the literature inspector may allow the user to print out the summary in hard copy format.

As described above, the placeholder inspector may appear in the training in places where an object is planned, but has not been completely processed. The placeholder inspector is a text-based description of the object to be displayed. In an implementation consistent with the present invention, a user device 120 may, for example, request a particular graphical user interface from the server 110. In those situations when the graphical user interface is associated with an object from object library database 320, the server 110 may cause the graphical user interface and text-based description (or placeholder inspector) to be displayed on the user device 120 while the server 110 retrieves the object from object library database 320. Once the object has been retrieved, the server 110 may cause the object to be displayed in the graphical user interface in the location of the text-based description. Records in the lesson collection database 310 may include a text field that provides a text-based description of the object in development. This is a very valuable tool for developers, reviewers, and authors.

The slide inspector may allow viewing of slides; echocardiograms with their associated views, interpretation movie, and orientation movie; nuclear scans with associated views, interpretation movie, and orientation movie; cineangiograms with associated views, interpretation movie, and orientation movie; radiographs with associated views, interpretation movie, and orientation movie; and hemodynamic tracings with associated views, interpretation movie, and orientation movie; and heart sounds with associated graphics and interpretation movie. The single inspector may allow the user to view a single image, such as a histomicrograph, a photograph, or drawing.

The server 110 may include additional inspectors that aid in the creation, modification, or viewing of objects. For example, the server 110 may include inspectors that allow the user to view different types of objects within the same case as well as an inspector that allows an author to pick and choose images or views from specific studies and put them together in a single environment for presentation.

The tracking database 330 may store information relating to individual users of the medical training environment. The information may include, for example, the dates and times in which a particular user accessed the medical training environment, the areas of the medical training environment that were accessed by the user, the user's performance with respect to questions presented during the medical training, and feedback and comments provided by the user regarding aspects of the medical training environment.

Exemplary Configuration of user Device and Authoring Device

Figure 4:
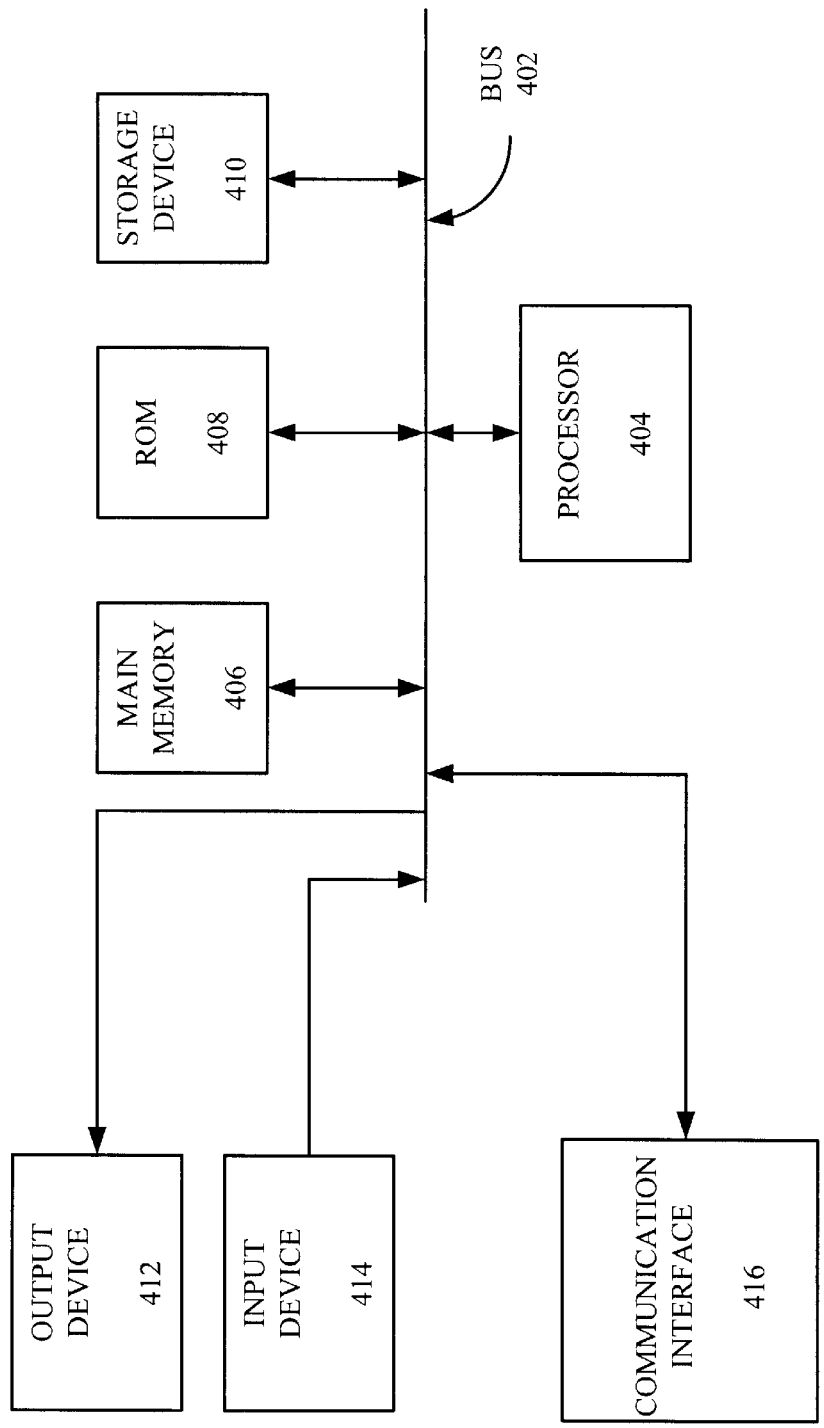
FIG. 4 illustrates an exemplary configuration of a user device or authoring device consistent with the present invention.

FIG. 4 illustrates an exemplary configuration of a user device 120 consistent with the present invention. The authoring device 130 may be similarly configured. The user device 120 may include a bus 402, a processor 404, a memory 406, a ROM 408, a storage device 410, an output device 412, an input device 414, and a communication interface 416. The bus 402 may include one or more conventional buses that permit communication among the components of the user device 120.

The processor 404 may include any type of conventional processor or microprocessor that interprets and executes instructions. The memory 406 may include a RAM or another type of dynamic storage device (referred to as main memory) that stores information and instructions for execution by the processor 404. Main memory 406 may also be used to store temporary variables or other intermediate information during execution of instructions by processor 404.

ROM 408 may include a conventional ROM device and/or another type of static storage device that stores static information and instructions for processor 404. The storage device 410 may include a magnetic disk or optical disk and its corresponding drive and/or some other type of magnetic or optical recording medium and its corresponding drive for storing information and instructions.

The output device 412 may include one or more conventional mechanisms that output information to an operator, including a display, a printer, a speaker, etc. The input device 414 may include one or more conventional mechanisms that permit the operator to input information to the user device 120, such as a keyboard, a mouse, a pen, voice recognition and/or biometric mechanisms, etc. The communication interface 416 may include any transceiver-like mechanism that enables the user device 120 to communicate with other devices and/or systems, such as the server 110. For example, the communication interface 416 may include a modem or an Ethernet interface to a network. Alternatively, communication interface 416 may include other mechanisms for communicating via a data network, such as network 140.

A user device 120, consistent with the present invention, provides medical training to a user, via one or more graphical user interfaces, in response to processor 404 executing sequences of instructions contained in memory 406. Such instructions may be read into memory 406 from another computer-readable medium, such as a storage device 410, or from a separate device via communication interface 416. In alternative embodiments, hard-wired circuitry may be used in place of or in combination with software instructions to implement the present invention. Thus, the present invention is not limited to any specific combination of hardware circuitry and software.

The authoring devices 130 allow remotely located authors to create and/or modify lesson plans associated with server 110. An authoring device 130, consistent with the present invention, performs the acts described below in response to processor 404 executing sequences of instructions contained in memory 406. Such instructions may be read into memory 406 from another computer-readable medium, such as a storage device 410, or from a separate device via communication interface 416. In alternative embodiments, hardwired circuitry may be used in place of or in combination with software instructions to implement the present invention. Thus, the present invention is not limited to any specific combination of hardware circuitry and software.

Exemplary Processing

Figure 5:
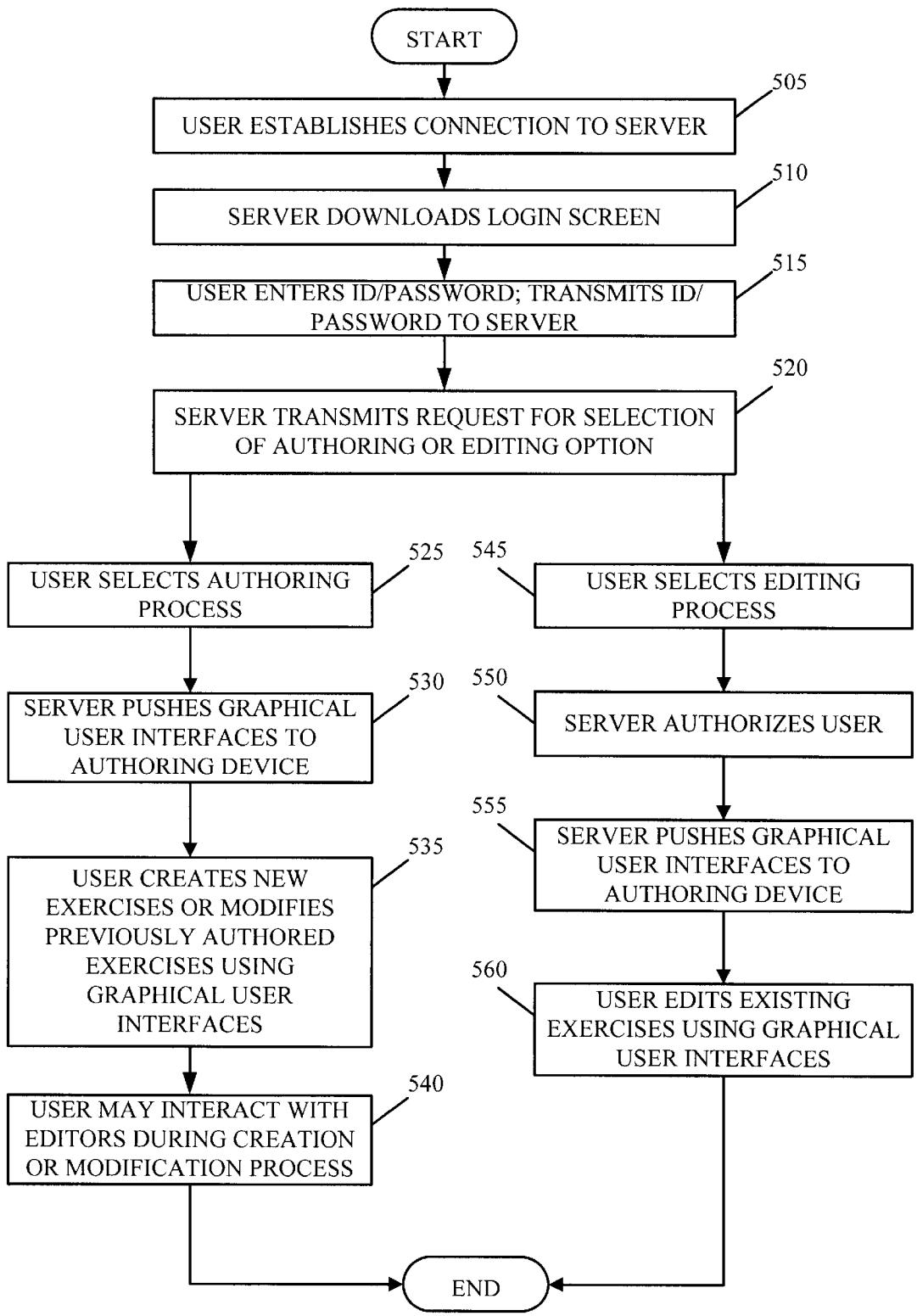
FIG. 5 illustrates an exemplary process, consistent with the present invention, by which a user may author or edit lesson plans.

FIG. 5 illustrates an exemplary process, consistent with the present invention, by which a user may author or edit lesson plans in the medical training environment. Processing may begin when a user, via an authoring device, such as authoring device 130, establishes a connection to server 110 [act 505]. The user may, for example, accomplish this via any conventional Internet connection by entering a link or address, such as a uniform resource locator (URL), associated with the server 110. In alternative implementations, the user may establish a direct connection with the server 110. In each of these scenarios, the server 110 may then transmit a login screen to the user [act 510].

Figure 6:
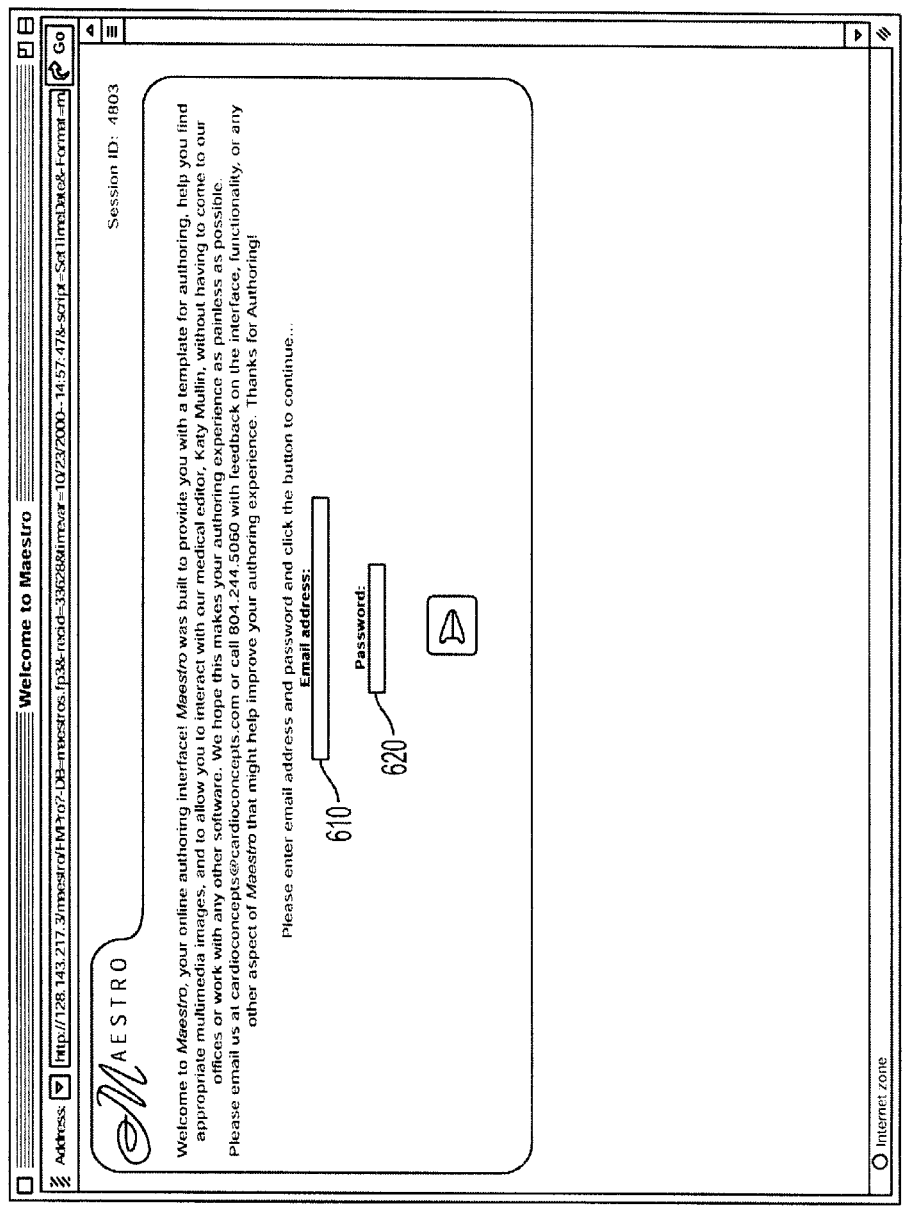
FIG. 6 illustrates an exemplary login screen consistent with the present invention.

FIG. 6 illustrates an exemplary login screen 600 consistent with the present invention. As illustrated, the login screen 600 prompts the user to enter an identifier (ID) 610 and password 620. The identifier may be, for example, an e-mail address associated with the user.

The user may enter an ID and password in a well-known manner via the authoring device 130 [act 515]. The authoring device 130 may then transmit the user ID and password to the server 110 [act 515]. The server 110 may verify that the user is authorized by, for example, comparing the user's ID and password to authorized identifiers and passwords [act 520]. If the user is authorized, the server 110 may transmit a secondary login screen that allows the user to select whether to log in as an author or editor [act 520]. Implementations consistent with the present invention grant certain users authoring privileges and others authoring and editing privileges.

Figure 7:
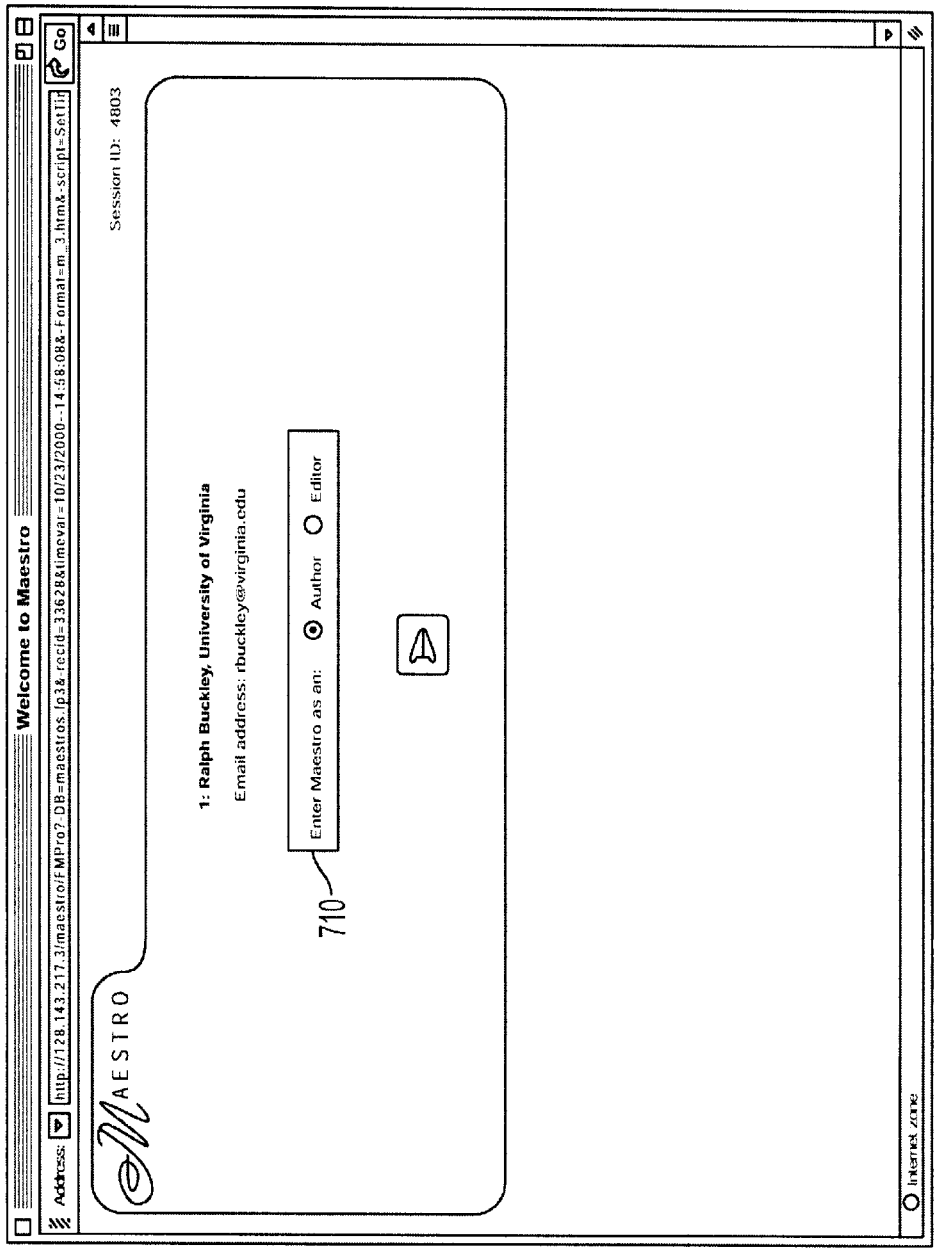
FIG. 7 illustrates an exemplary secondary login screen consistent with the present invention.

FIG. 7 illustrates an exemplary secondary login screen 700 consistent with the present invention. As illustrated, the secondary login screen 700 allows the user to select an authoring or editing option 710.

Assume that the user selects the authoring option in secondary login screen 700 [act 525]. The server 110 may then transmit one or more graphical user interfaces to the authoring device 130 to facilitate the authoring process [act 530]. These graphical user interfaces act to guide the user through the "section" or "exercise" creation process. As described above, exercises are the basic elements used to populate lessons within the learning environment. Exercises may consist of pages that include questions and statement objects along with imagery objects. During the authoring process, the user may associate questions, including answers and answer feedback/responses, and statements with the exercises created, link these pages to objects in the object database 320, and, as will be described in more detail below, interact with a medical editor in an interactive editing process.

Figure 8:
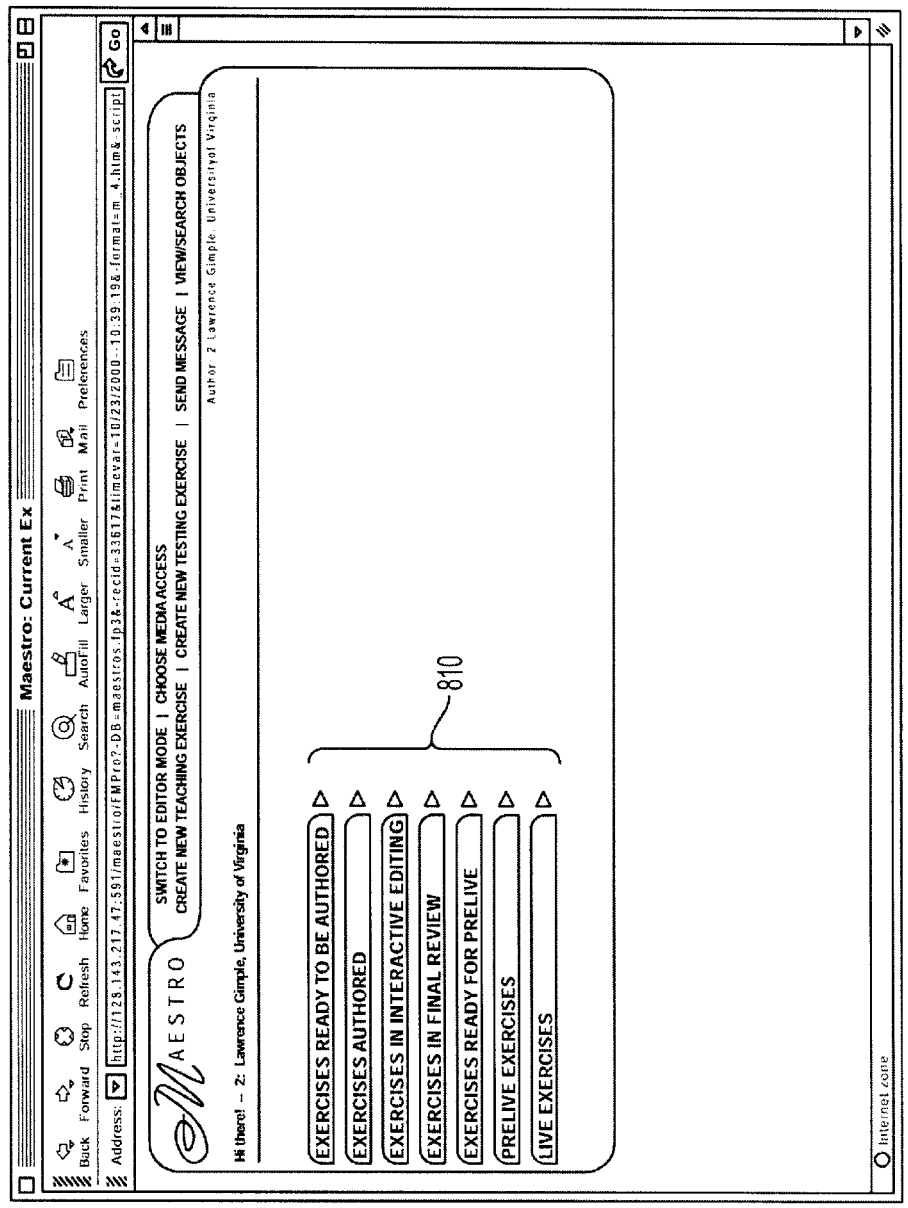

FIGS. 8–18 illustrate exemplary graphical user interfaces, consistent with the present invention, that may be provided to the user of authoring device 130 during the authoring process. As illustrated in FIG. 8, the user may be provided with a list of tabs 810 in a graphical user interface 800. Each tab may be associated with exercises at a different stage of creation. For example, exercises that have not yet been created may be associated with the "Exercises Ready To Be Authored" tab. Exercises that have been created, but have not yet been edited, may be associated with the "Exercises Authored" tab. The exercises move up through the various stages until they reach a "live" status. Live exercises are those exercises that are ready for display on the Internet to educational users.

Figure 9:
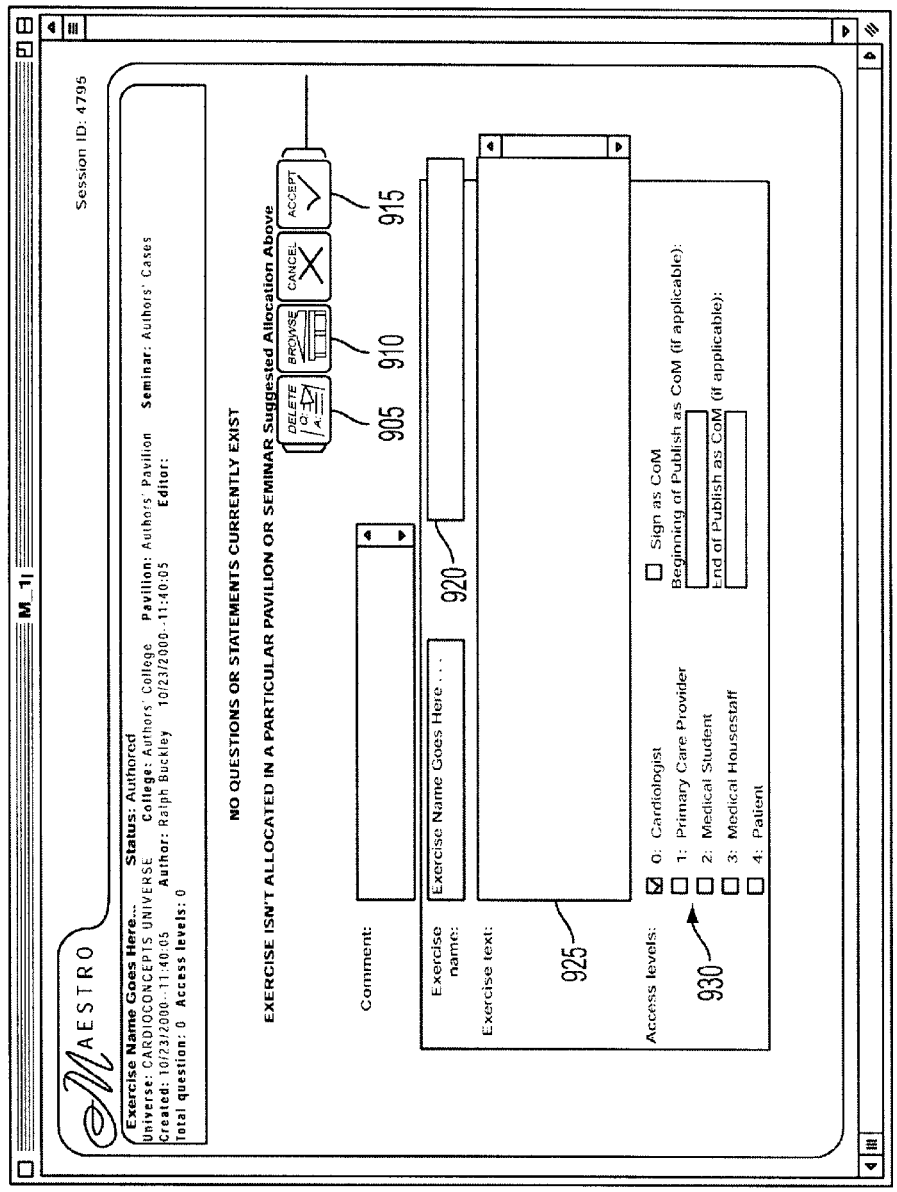

Assume that the user selects the "Exercises Ready To Be Authored" tab in FIG. 8. FIG. 9 illustrates an exemplary graphical user interface 900 that may be provided to the user. The graphical user interface 900 allows the user to delete the exercise 905, browse through a list of existing pavilions and seminars to decide with which pavilion and seminar the exercise is to be associated 910, accept the exercise 915, enter the title of the exercise 920, enter a brief description of the exercise 925, and specify the type of audience for which the exercise is intended 930. As illustrated, the user may specify one or more of the following exemplary audiences for the exercises: cardiologists, primary care providers, medical students, medical housestaff, and patients.

Figure 10:
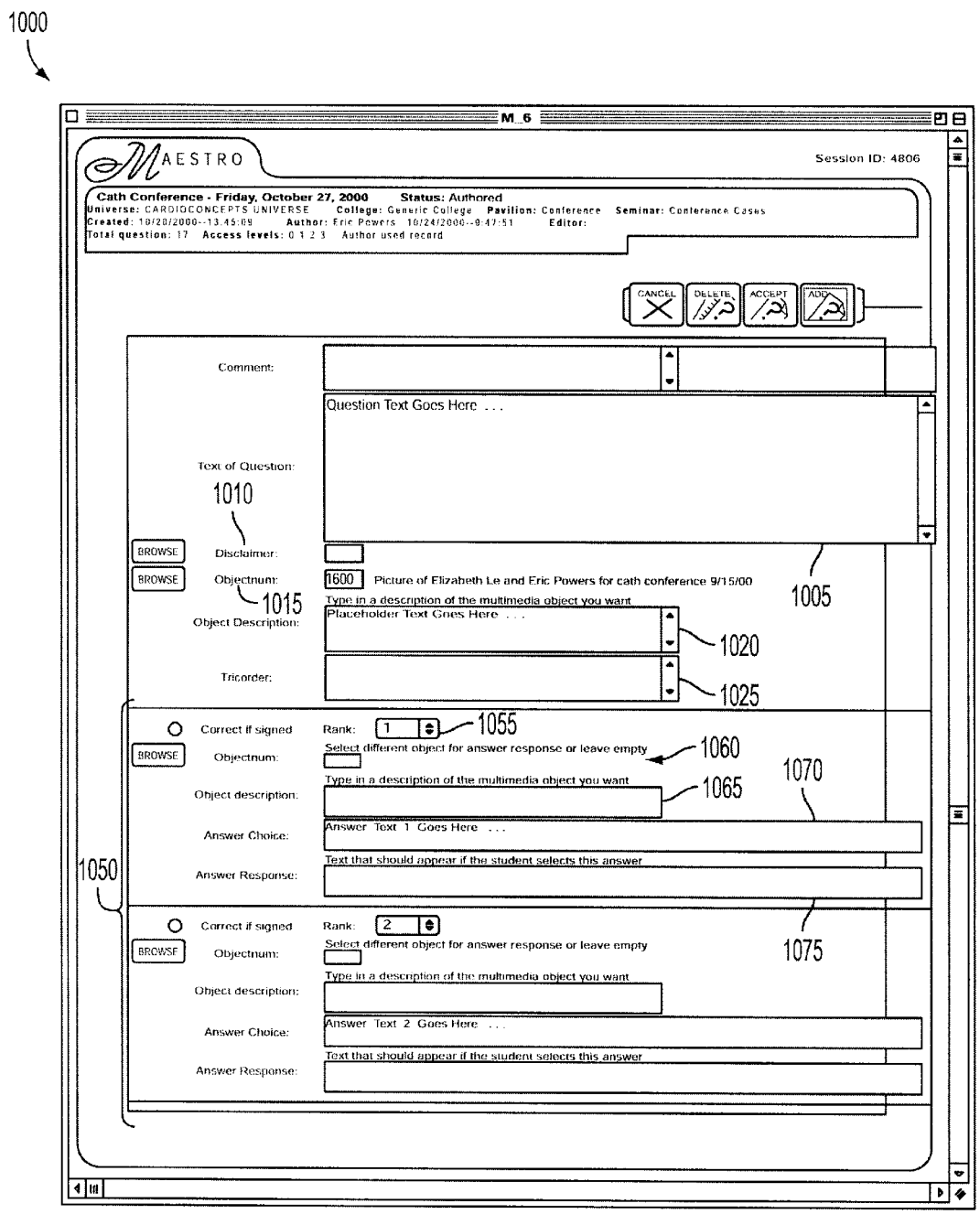

Each exercise created by the user may be associated with one or more questions and/or statements. FIG. 10 illustrates an exemplary graphical user interface 1000 that may be provided to the user for creating questions. The graphical user interface 1000 allows the user to enter the actual text of the question 1005, enter a disclaimer number of a disclaimer to be associated with the question 1010, enter an object number of an object from object library database 320 to be associated with the question 1015, enter a textual description (or placeholder) of a selected object 1020, and enter tricorder text (if any) to be associated with the question 1025. The graphical user interface 1000 also allows the user to enter a group of multiple choice answers 1050 that are to be associated with the question. For each multiple choice answer, the user may enter the order in which the answer is to appear (i.e., the user may rank the answers) 1055, an object number of an object to be displayed with the answer 1060, a description of the object that is to be displayed 1065, the actual text for the answer 1070, and an answer response that is to be displayed if the student selects this particular answer 1075.

Figure 11:
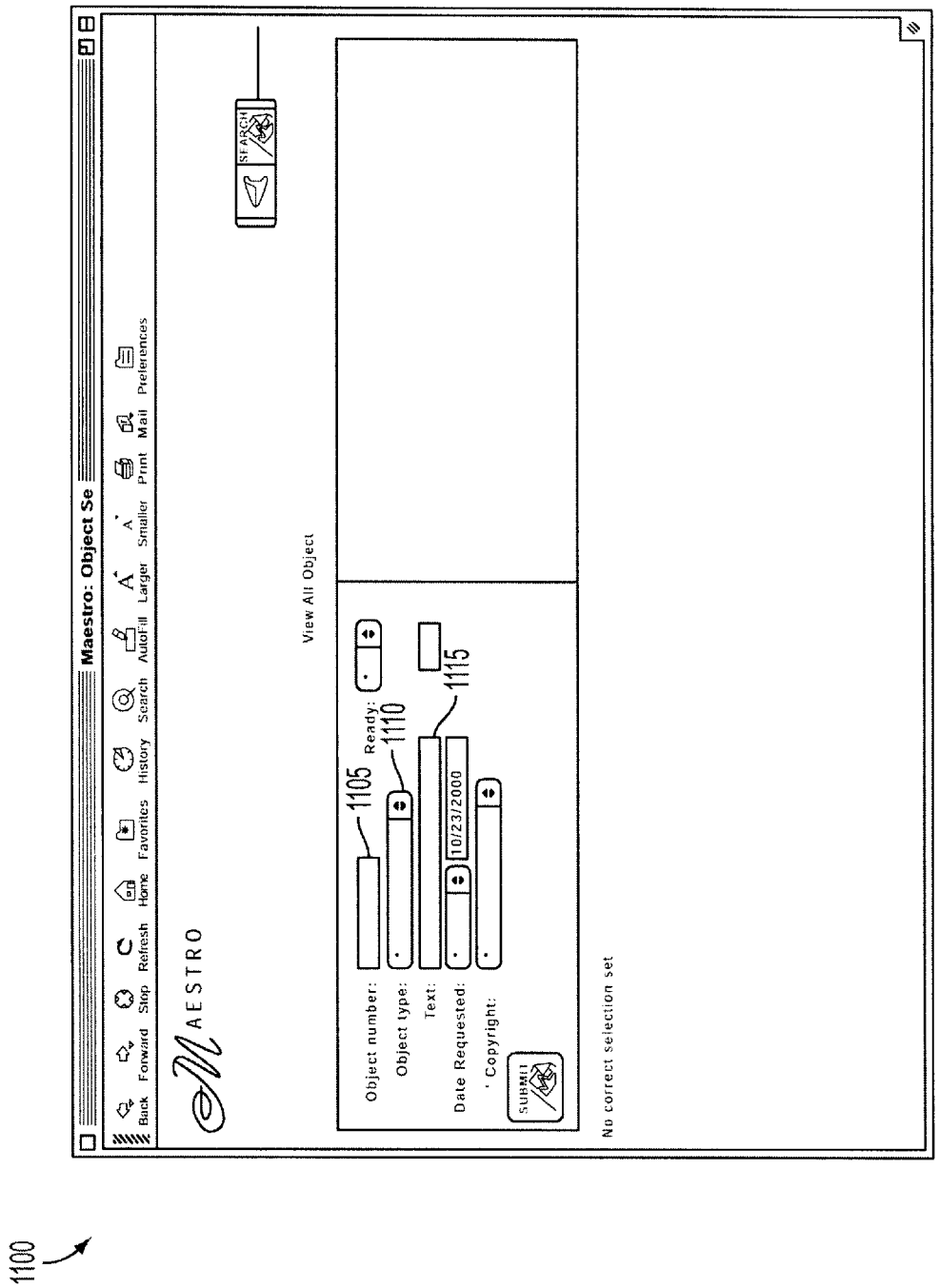

If the user wants to associate an object with a question or answer and the user does not know the object number associated with the object, the user may decide to search the object library database 320 for the particular object desired. FIG. 11 illustrates an exemplary graphical user interface 1100 that may be provided to the user for searching the object library database 320 for an object of interest. The graphical user interface 1100 allows the user to search the object library database 320 for an object by object number 1105, object type 1110, or text description 1115.

Figure 12:
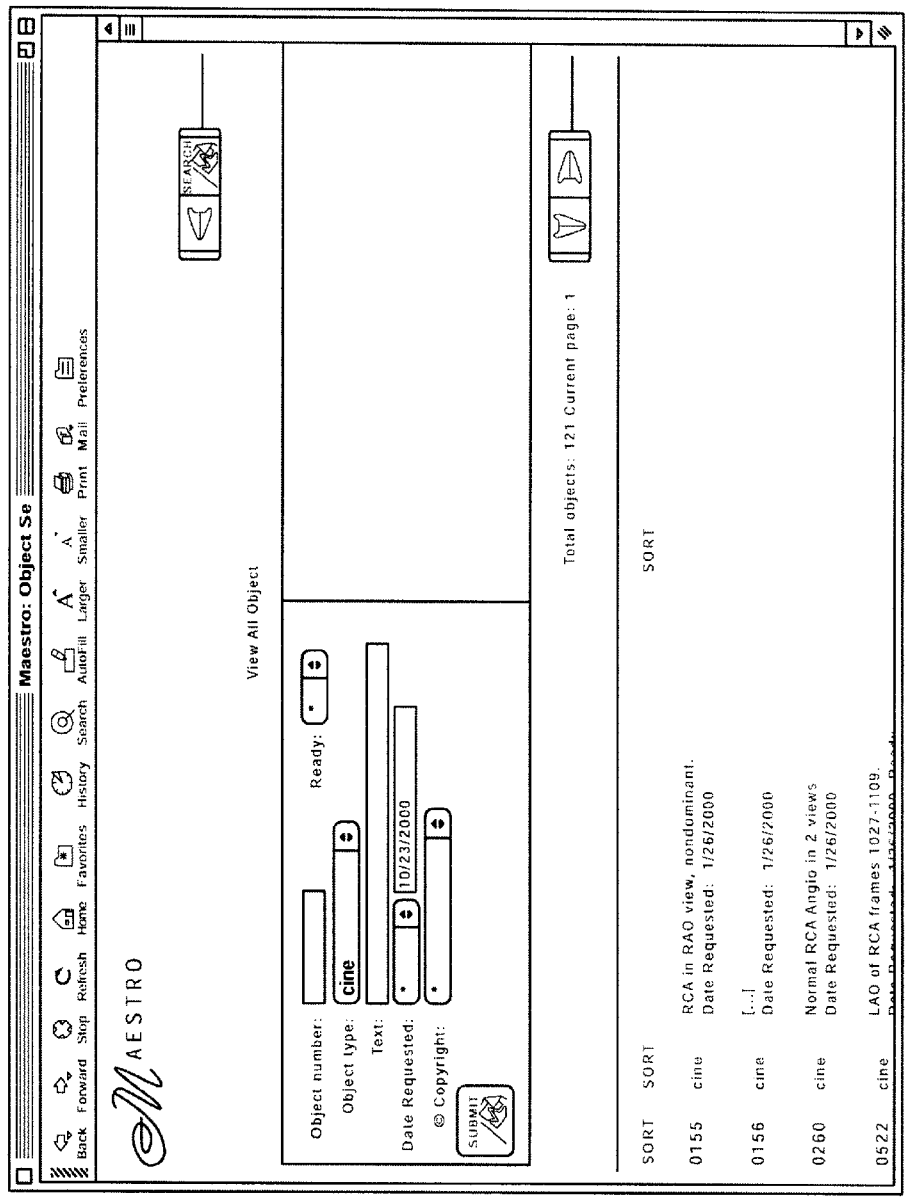
Figure 13:
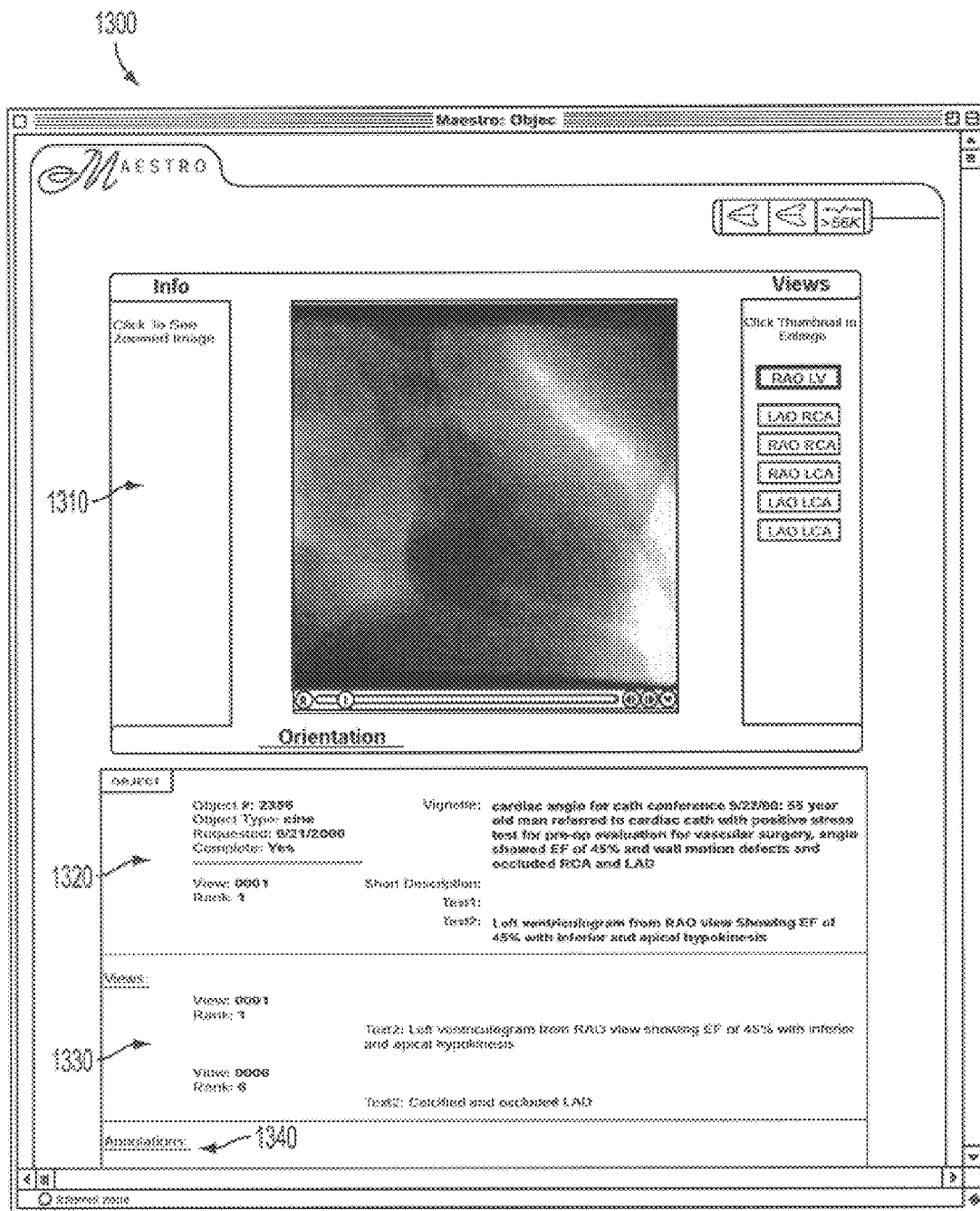

Assume that the user searches for an object by object type by entering or selecting, for example, "cine" in the object type field 1110. FIG. 12 illustrates an exemplary graphical user interface 1200 for providing the results of the object search. The graphical user interface 1200 may provide a list of objects having an object type of cine. Upon selecting one of the objects listed, the user may be provided with the exemplary graphical user interface 1300 illustrated in FIG. 13. As illustrated, the user may be provided with an illustration of the object 1310, a textual description of the object 1320, different image views that are available of the object 1330, and associated annotations 1340.

If in the graphical user interface 1000 of FIG. 10, the user wants to associate a disclaimer with the question, the user may enter a disclaimer number in the disclaimer field 1010. If the user does not know the disclaimer number associated with a disclaimer of interest, the user may select the browse button. Selecting the browse disclaimer button in the graphical user interface 1000 of FIG. 10 may cause the server 110 to provide the user with the graphical user interface 1400 illustrated in FIG. 14. As illustrated, the graphical user interface 1400 may include a list of drug therapy disclaimers or other disclaimers that can be associated with the question. The user may then select a disclaimer to be associated with the question.

Figure 15:
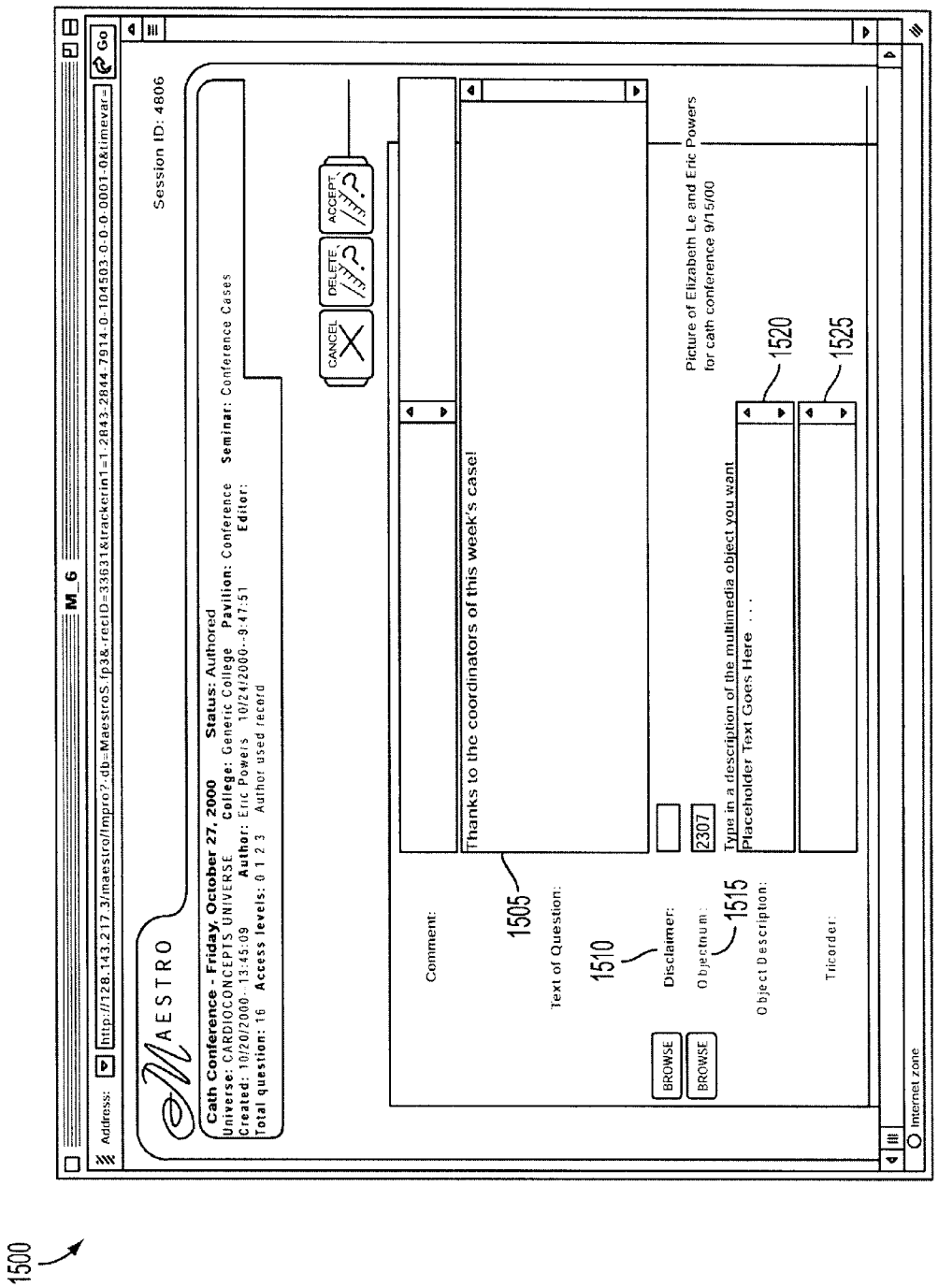

In some instances, the user may want to add a statement to the exercise that is being created. FIG. 15 illustrates an exemplary graphical user interface 1500 that may be provided to the user for adding a statement to an exercise. Similar to graphical user interface 1000 above, the graphical user interface 1500 allows the user to enter the actual text of the statement 1505, enter a disclaimer number of a disclaimer to be associated with the statement 1510, enter an object number of an object from object library database 320 to be associated with the statement 1515, enter a textual description (or placeholder) of a selected object 1520, and enter tricorder text (if any) to be associated with the statement 1525.

Returning to the process of FIG. 5, the user may create new exercises or modify previously authored exercises using the graphical user interfaces provided by server 110 [act 535]. During the authoring process, the user may also manipulate and edit objects in the object database 320, enter metadata relevant to the object, and track the object through editorial approval.

Figure 16:
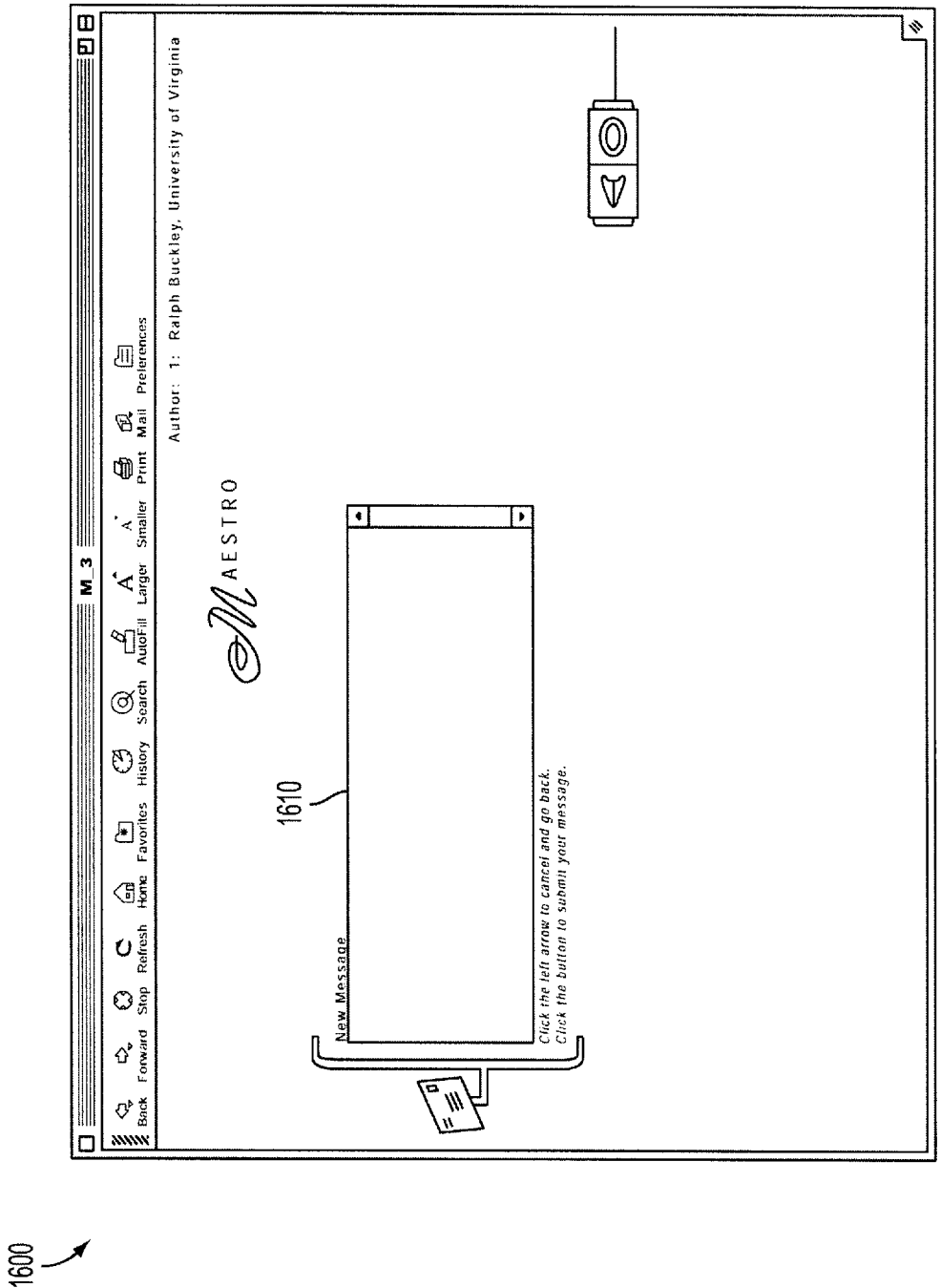

During or after the creation or modification process, the user may interact with medical editors in an interactive editing process [act 540]. FIG. 16 illustrates an exemplary graphical user interface 1600 by which a user may interact with medical editors. As illustrated, the user may enter a message into a text box 1610 and then transmit the message to the medical editors for review.

Once an exercise has been created, the user may submit the exercise to an editor for a peer-review and editorial process. The exercise record "edit-status" is changed to represent the editing status of the exercise and once it is approved is given "live" edit status and appears on the public sites. By having this managed system of editing online, one can have remote editors using standard browser technologies to manage the entire publication and peer review process.

Suppose now that the user selects the editing option in the secondary login screen 700 [act 545]. The server 110 may, in response to this selection, determine whether the user has editorial privileges [act 550]. The server 110 may determine whether editorial privileges exist by comparing the user's identifier to a list of authorized identifiers. If the user does not have editorial privileges, the server 110 may notify the user of such. If the server 110 determines that the user does have editorial privileges, the server 110 may transmit one or more graphical user interfaces to the authoring device 130 to facilitate the editing process [act 555].

Figure 17:
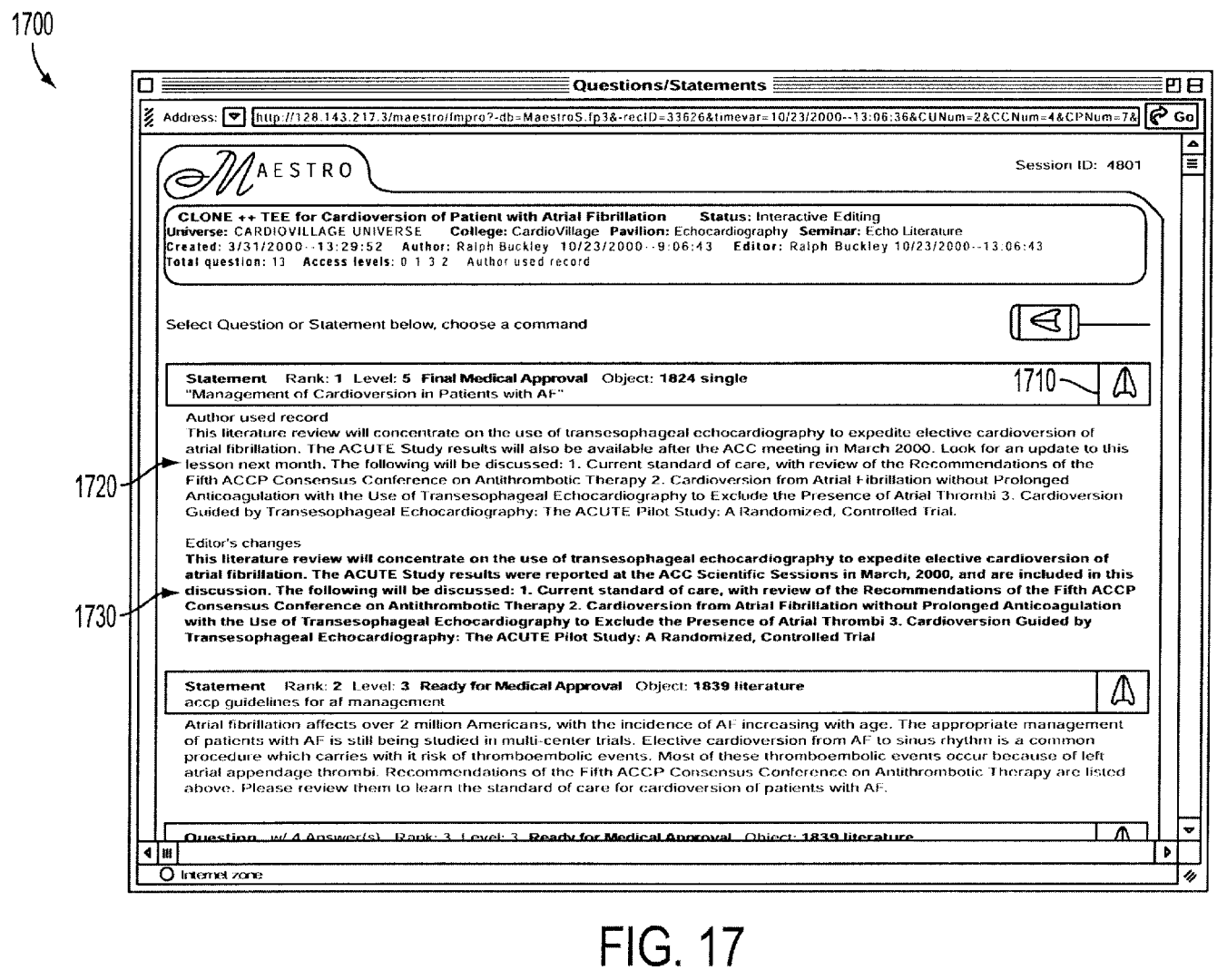
Figure 18:

FIGS. 17 and 18 illustrate exemplary graphical user interfaces that may be provided to the user during the editing process. The server 110 may also provide graphical user interfaces similar to the ones described above with respect to the authoring process.

FIG. 17 illustrates an exemplary graphical user interface 1700 by which a user may edit an existing exercise. The graphical user interface 1700 may, for example, be provided to the user during an interactive editing session. As illustrate, the graphical user interface 1700 allows the user to change where in an exercise a question or statement will appear 1710. The graphical user interface 1700 also displays the author's version of the question or statement 1720 along with the editor's version of the question or statement 1730.

FIG. 18 illustrates an exemplary graphical user interface 1800 by which the user may edit a question or statement. The graphical user interface 1800 allows the user to designate the status of the question or statement 1810, view the text of the author's version of the question or statement 1820, and enter changes to the author's question or statement 1830.

Returning to the process of FIG. 5, the user may edit existing exercises using the graphical user interfaces provided by the server 110 [act 560]. As described above, an authoring environment, consistent with the present invention, allows authors and editors to preview the lessons during the authoring/editing process. Authors and editors may also view lessons "as they would appear" on the finished web site. This represents true what you see is what you get (WYSIWYG) functionality that is possible because of the modular structure of the lessons and the ability to display the data in multiple formats.

Figure 19:
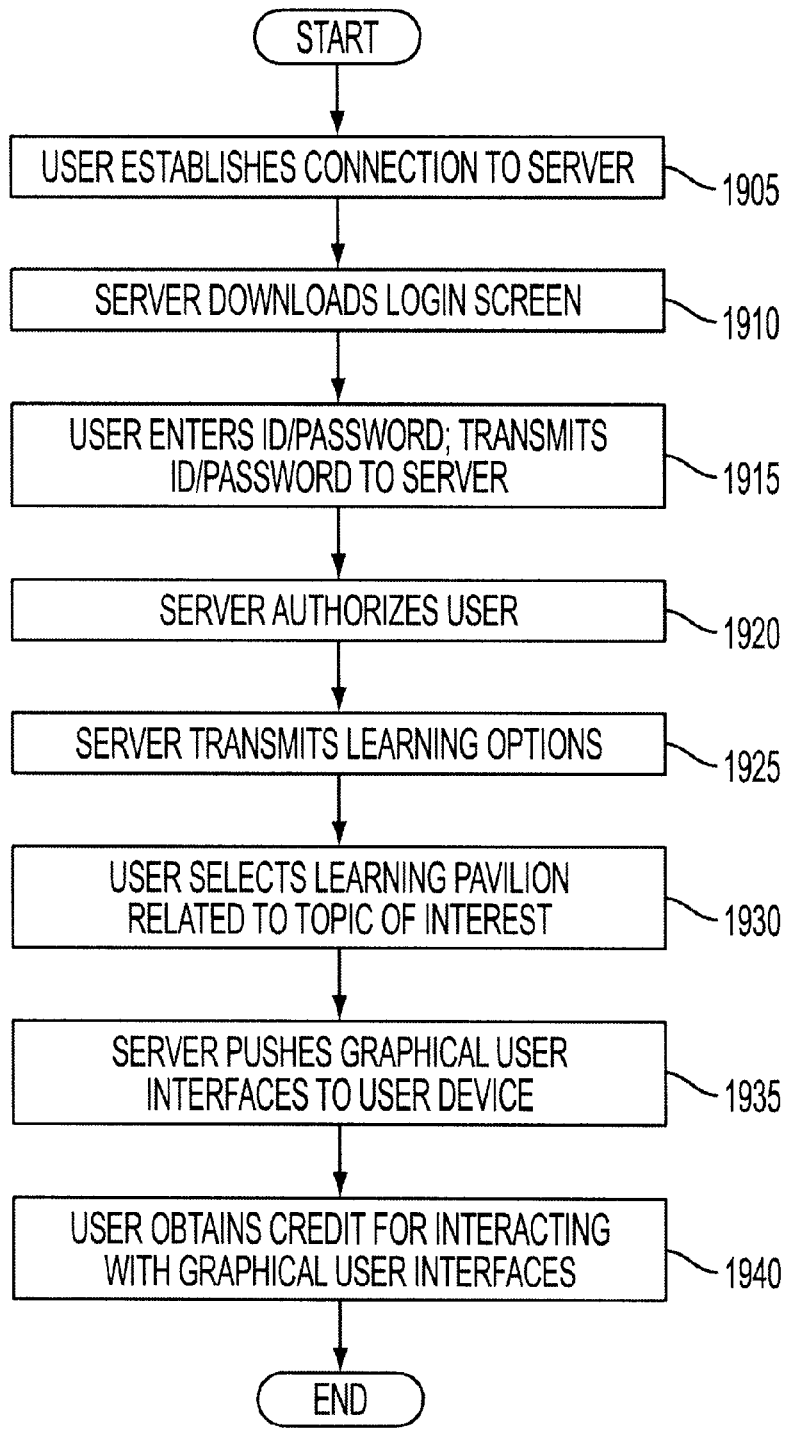
FIG. 19 illustrates an exemplary process, consistent with the present invention, by which a user may obtain medical training.

FIG. 19 illustrates an exemplary process, consistent with the present invention, by which a user may obtain medical training. Processing may begin when a user, via a user device, such as user device 120, establishes a connection to server 110 [act 1905]. The user may, for example, accomplish this via any conventional Internet connection by entering a link or address, such as a uniform resource locator (URL), associated with the server 110. In alternative implementations, the user may establish a direct connection with the server 110. In each of these scenarios, the server 110 may then transmit a login screen to the user [act 1910].

The user may enter a user ID and password in a well-known manner via the user device 120 [act 1915]. The user device 120 may then transmit the user ID and password to the server 110 [act 1915]. The server 110 may verify that the user is authorized by, for example, comparing the user's ID and password to authorized identifiers and passwords [act 1920]. The server 110 may also determine, based on the ID and password, with what type of audience the user is associated. In such a situation, the server 110 may tailor the medical training to the audience type to which the user belongs. If the server 110 determines that the user is authorized, the server 110 may transmit an introductory screen that allows the user to select an educational area of interest [act 1925].

Figure 20:
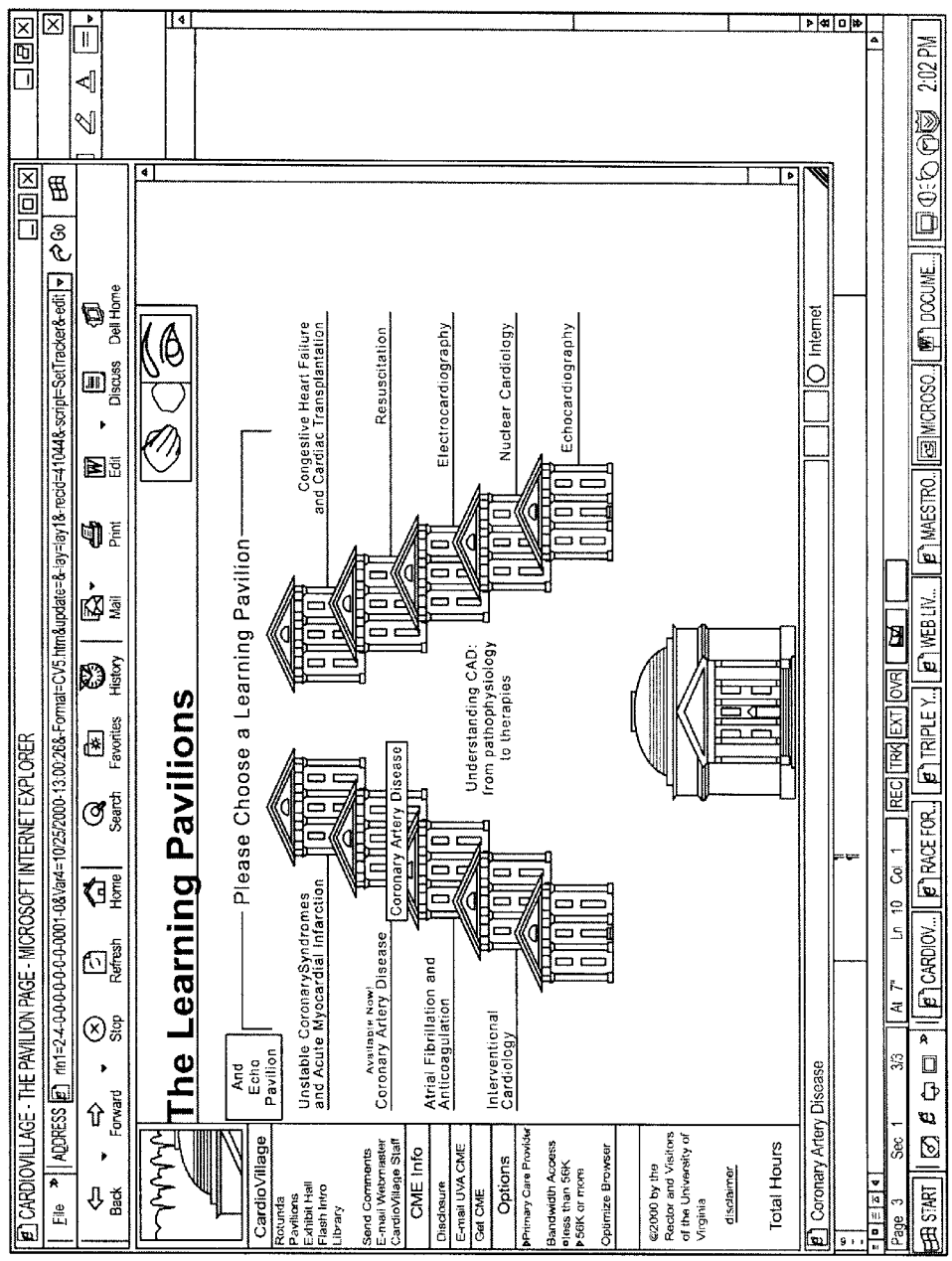
FIG. 20 illustrates an exemplary introductory screen consistent with the present invention.

FIG. 20 illustrates an exemplary introductory screen 2000 consistent with the present invention. As illustrated, the user may select from the following exemplary learning pavilions: unstable coronary syndromes and acute myocardial infarction, coronary artery disease, atrial fibrillation and anticoagulation, interventional cardiology, congestive heart failure and cardiac transplantation, resuscitation, electrocardiography, nuclear cardiology, and echocardiography.

Assume, for example, that the user selects the coronary artery disease pavilion [act 1930]. In response, the server 110 may transmit one or more graphical user interfaces to the user device 120 pertaining to the topic of interest [act 1935]. FIGS. 21–24B illustrate exemplary graphical user interfaces that may be provided to the user device 120 by the server 110.

Figure 21:
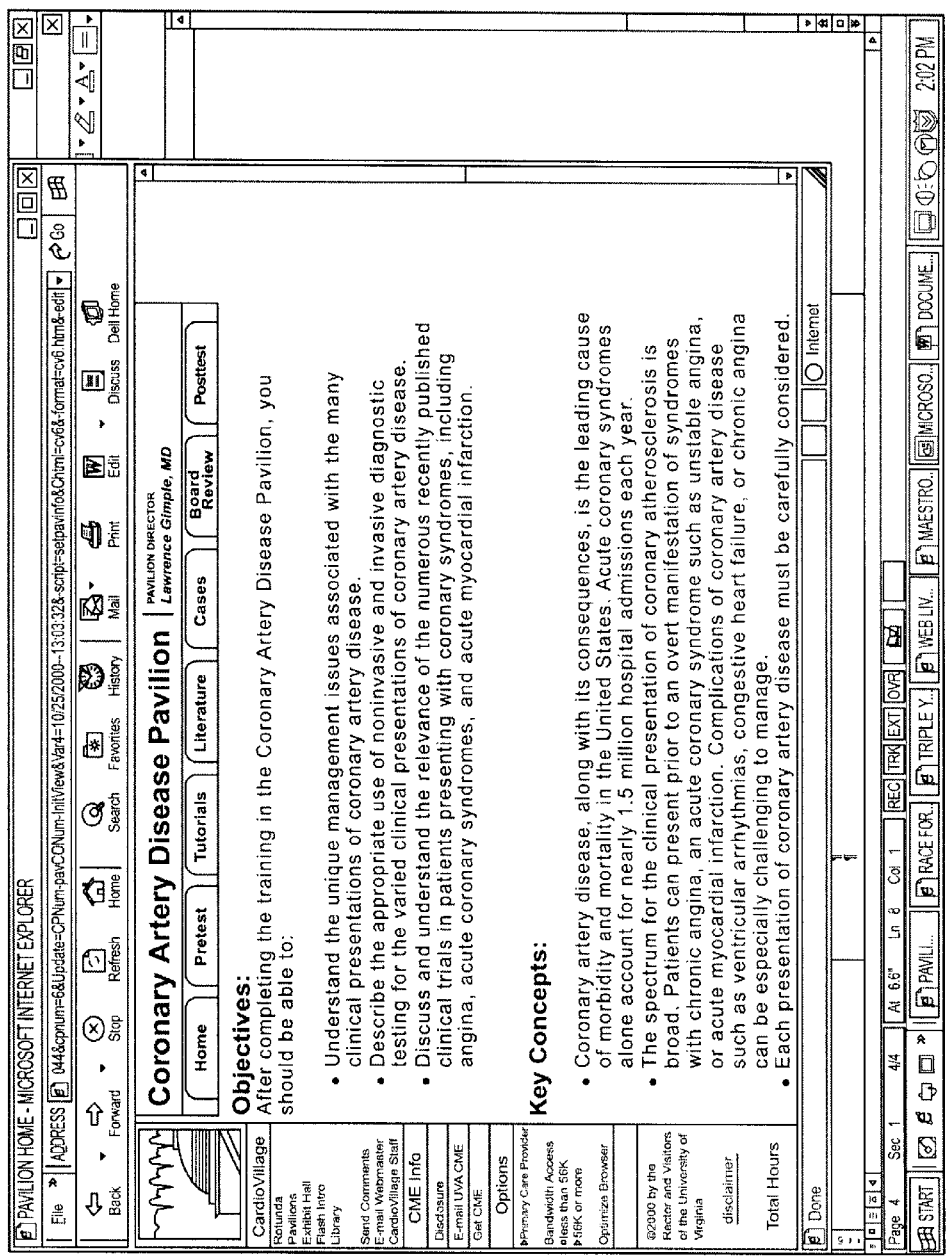
FIGS. 21–24B illustrate exemplary graphical user interfaces that may be provided to the user device by the server.

Upon entering a learning pavilion, the server 110 may transmit a graphical user interface that provides the objectives and concepts covered in the pavilion. FIG. 21 illustrates an exemplary graphical user interface 2100 that may be provided to a user upon entering a pavilion. As illustrated, the pavilion may be broken down into the following exemplary sections: a pretest section, a tutorials section, a literature section, a cases section, a board review section, and a posttest section. Each section provides the user with questions and/or statements that help determine the user's understanding of the topic.

The pretest and posttest sections may provide a group of questions relating to the topic selected. At the conclusion of the pretest and posttest sections, the server 110 may provide the user with a score indicative of the user's performance. As will be described in more detail below, the server 110 may track the user's performance with regard to the questions and store the results in tracking database 330.

The tutorials section may provide a more in depth view of the topic of interest. The literature section may provide information relating to major clinical trials. The literature section is designed to enhance the user's grasp of key concepts presented in the trials. The cases section may include information that allows the user to follow a patient though presentation, diagnosis, intervention, and follow up. The board review section may include information relating to topics commonly found on the Medical Board exams.

Figure 22:
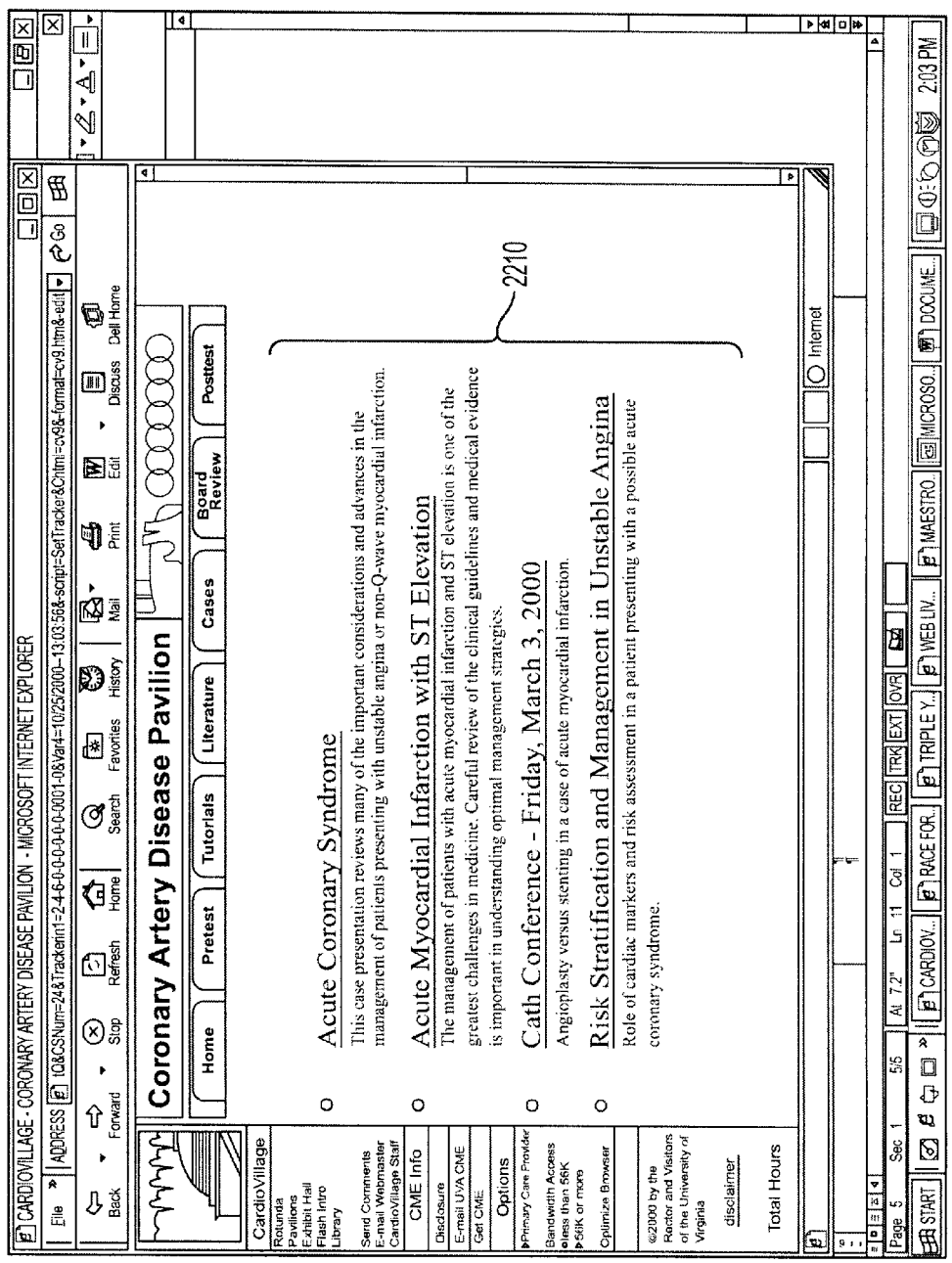

Assume, for example, that the user selected the cases section in FIG. 21. In response, the server 10 may provide the user with a graphical user interface containing a list of cases. FIG. 22 illustrates an exemplary graphical user interface 2200 that may be provided by server 110. As illustrated, the graphical user interface 2200 may provide the user with a list of case exercises 2210 related to the topic of interest. These case exercises, as described above, follow a patient though presentation, diagnosis, intervention, and follow up.

Figure 23:
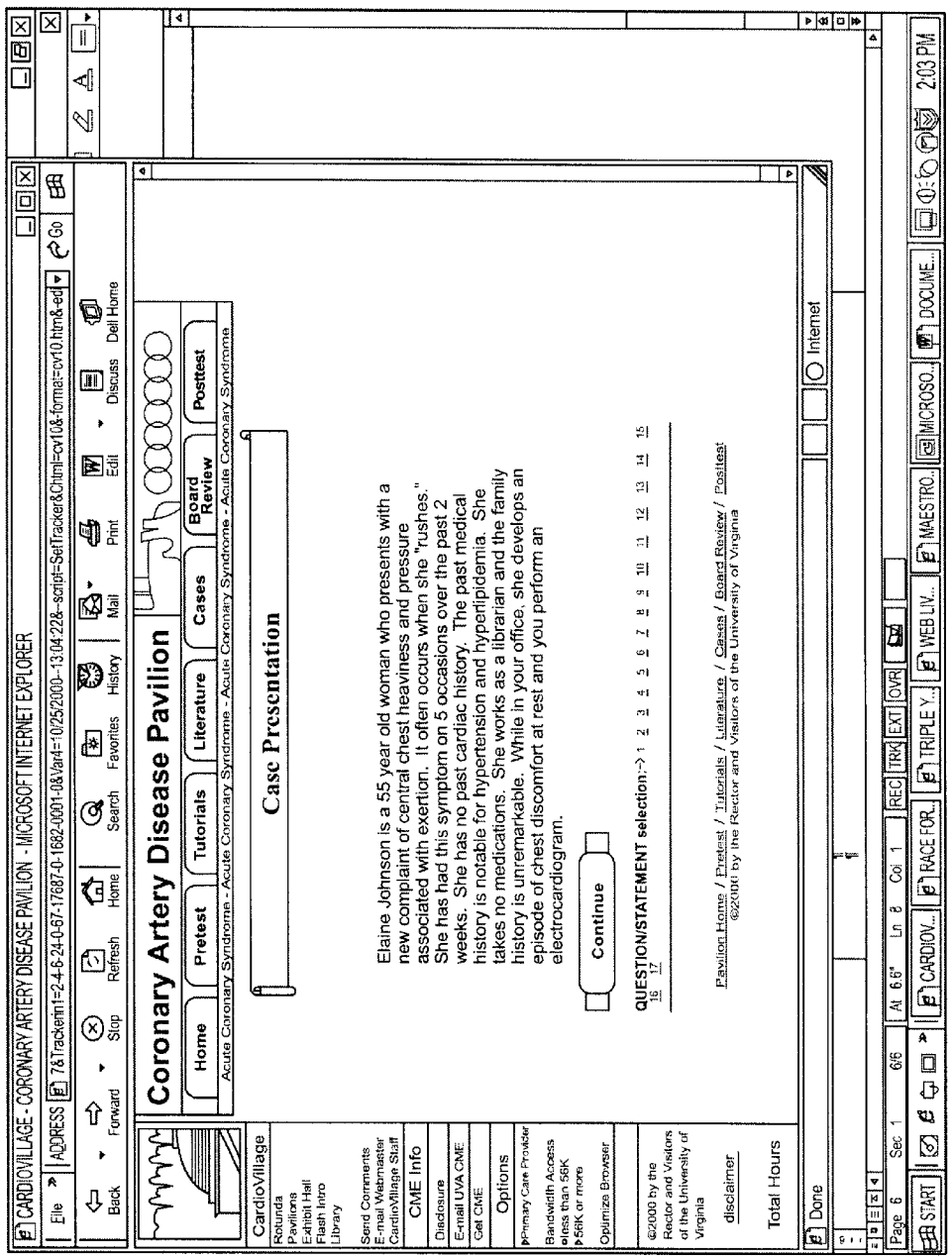
Figure 24A:
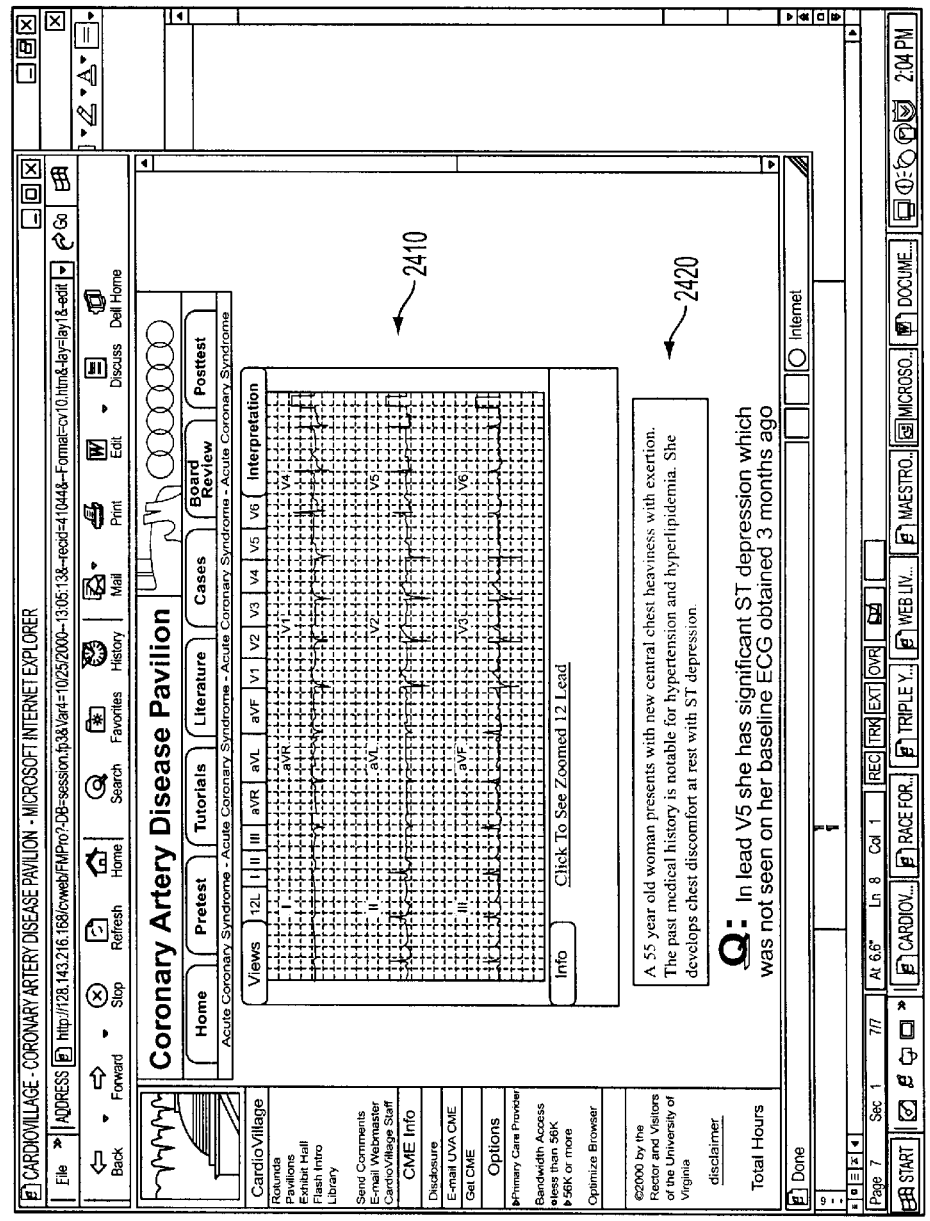
Figure 24B:
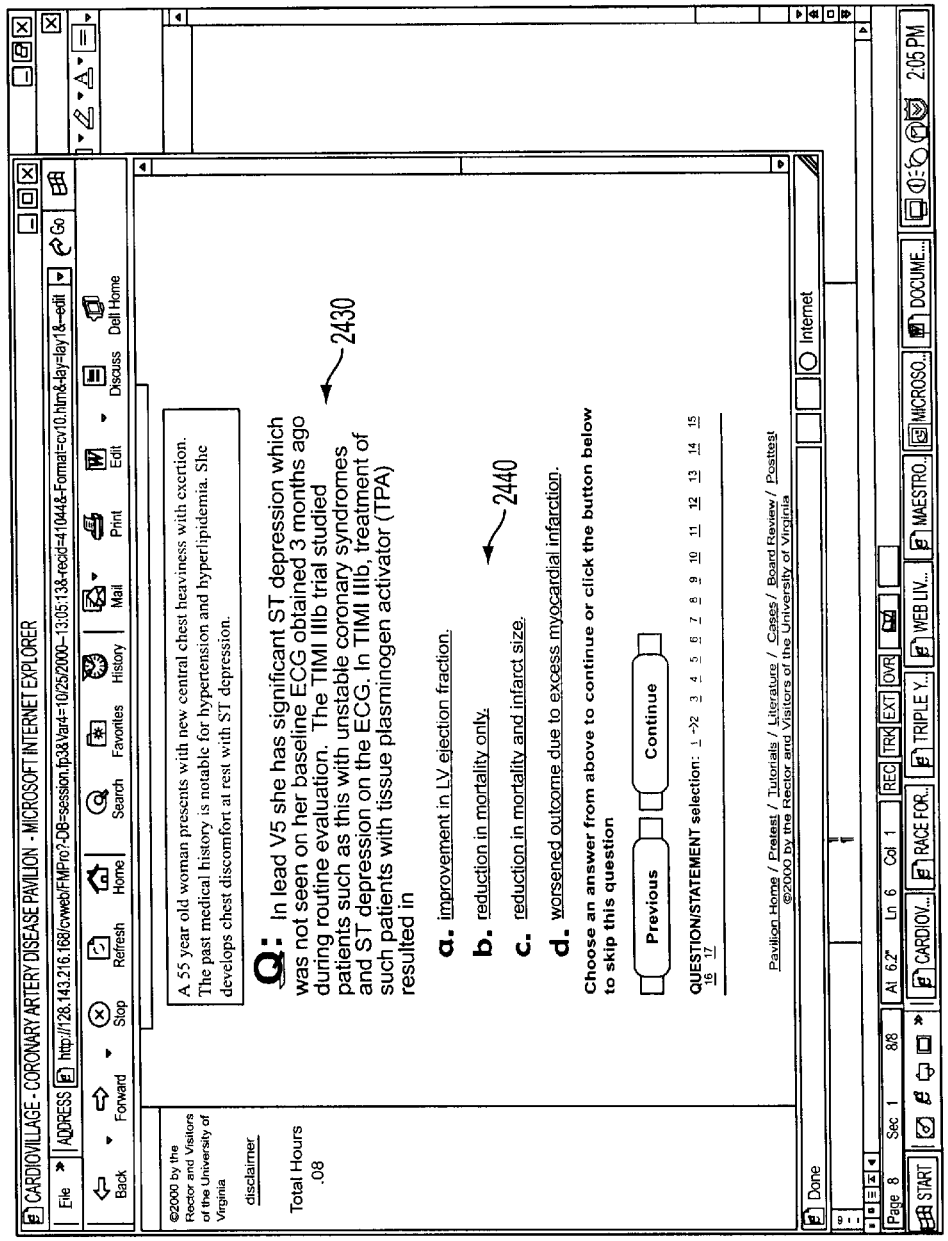

Upon selection of a case exercise, the server 110 may provide the user with one or more graphical user interfaces containing questions and/or statements to test the user's understanding of the topic. FIG. 23 illustrates an exemplary graphical user interface 2300 that may be provided to the user. As illustrated, the graphical user interface 2300 may provide the user with a question or statement, as well as an indication of how may total questions/statements the particular case exercise contains. FIG. 23 illustrates an exemplary statement. FIGS. 24A and 24B illustrate an exemplary graphical user interface 2400 that contains a question. As illustrated, the graphical user interface 2400 may include an object 2410 from object library database 320, a tricorder 2420 that reminds the user what is happening to the patient, a question 2430, and a group of multiple choice answers 2440.

Returning to the process of FIG. 19, the user may interact with the graphical user interfaces provided by the server 110 in order to keep abreast of the latest information regarding the topic of interest [act 1940]. In an implementation consistent with the present invention, the user may obtain medical credits toward a degree or continuing medical education credits by interacting with the graphical user interfaces provided by server 110.

Figure 25:
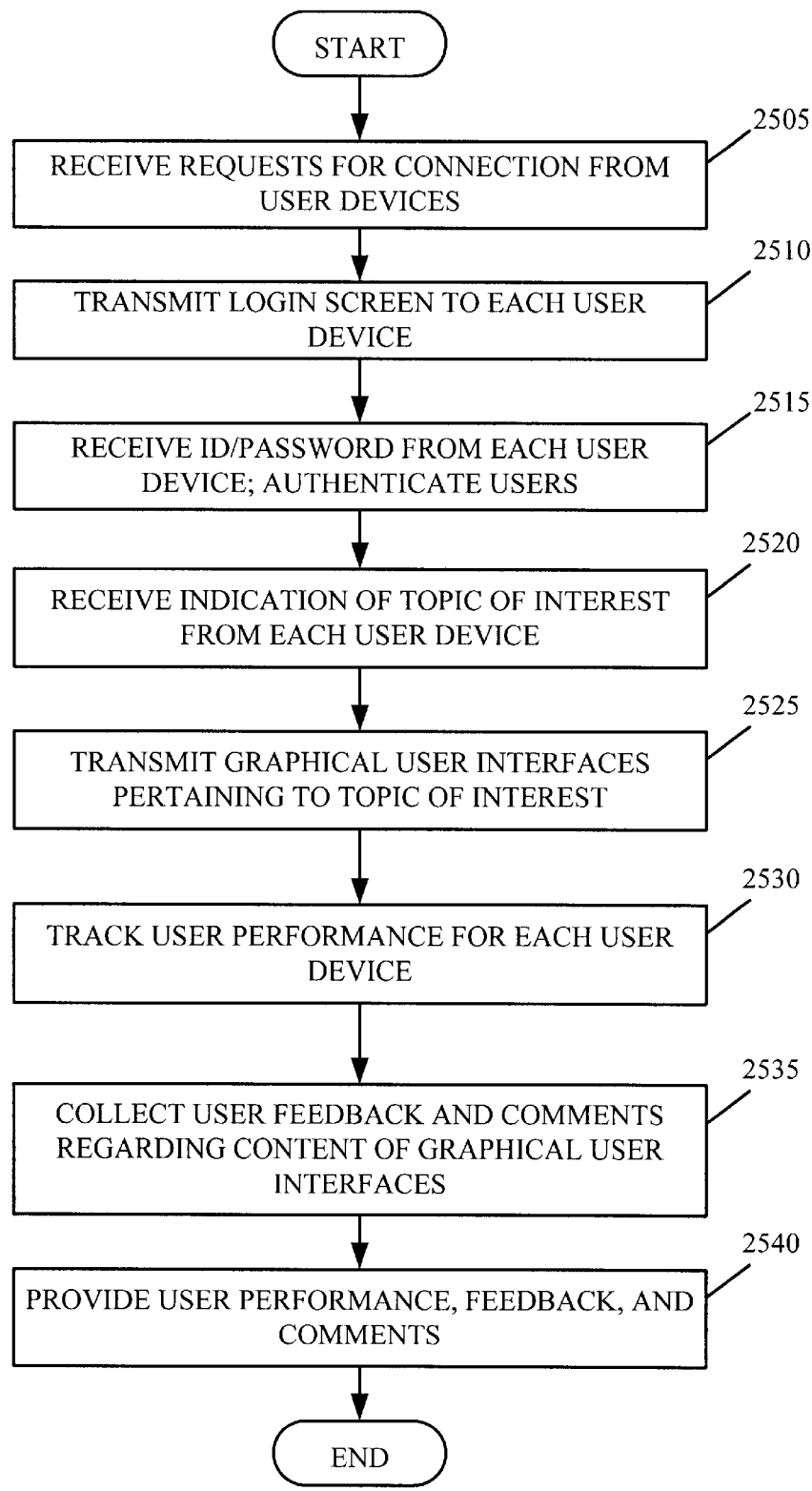
FIG. 25 illustrates an exemplary process by which the server tracks the performance of users of the learning environment.

FIG. 25 illustrates an exemplary process by which server 110 tracks the performance of users of the learning environment. Processing may begin with server 110 receiving connection requests from one or more user devices 120 [act 2505]. In response to the requests, the server 110 may transmit a login screen to each user device 120 [act 2510]. The server 110 may receive an ID and password from each user device 120 [act 2515]. The server 110 may use this information to not only authorize the user, but also to track the performance of the user with respect to exercises presented.

Upon authenticating each user, the server 110 may receive an indication of a topic of interest from the user devices 120 [act 2520]. As described above with respect to FIG. 20, this indication may be a result of the user selecting a learning pavilion from graphical user interface 2000. The server 110 may then transmit one or more graphical user interfaces to the user related to the topic indication [act 2525]. The graphical user interfaces may, for example, be similar to those interfaces illustrated in FIGS. 21–24B. As the user interacts with the graphical user interfaces, the server 110 may keep track of, for example, the topical areas for which graphical user interfaces have been provided, the user's performance with respect to the questions presented, etc.

[act 2530]. This information may be stored, for example, in tracking database 330 and later used to determine whether to give credit to the user for a degree or continuing education.

The server 110 may also collect feedback or comments from the user regarding the content of the graphical user interfaces [act 2535]. This allows for later editing of questions, statements, objects, etc. that may be confusing or inaccurate. The server 110 may store the feedback and comments in database 330. The server 110 may provide the collected information to the medical editors [act 2540].

CONCLUSION

Systems and methods, consistent with the present invention, allow for production, management, and delivery of a unique, customized learning environment over a network.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, the described implementation includes software and hardware, but elements of the present invention may be implemented as a combination of hardware and software, in software alone, or in hardware alone. Also, while series of acts have been described with regard to FIGS. 5, 19, and 25, the order of the acts may be varied in other implementations consistent with the present invention. No element, act, or instruction used in the description of the present application should be construed as critical or essential to the invention unless explicitly described as such.

The scope of the invention is defined by the following claims and their equivalents.

What is claimed is:

1. A system for creating a medical training program, comprising:

a server configured to store medical imagery objects, transmit one or more graphical user interfaces, receive at least one lesson related to a medical topic, and using the at least one lesson to create a medical training program; and an authoring device configured to receive the one or more graphical user interfaces, create the at least one lesson using the graphical user interfaces, the at least one lesson comprising at least one question or statement and being associated with at least one of the medical imagery objects, and transmit the at least one lesson to the server.

2. The system of claim 1 wherein the authoring device is further configured to:

display the at least one lesson with the associated at least one medical imagery object.

3. The system of claim 1 wherein the authoring device is further configured to:

transmit the at least one lesson to one or more remotely located medical editors, and receive editorial changes from the one or more remotely located medical editors.

4. A system for displaying images, comprising:

a memory configured to store instructions; and a processor configured to execute the instructions to receive a request for a graphical user interface from a user device, the graphical user interface being associated with at least one image and a textual description of the at least one image, cause the graphical user interface and textual description to be displayed on the user device, retrieve the at least one image, and cause the at least one image to be superimposed over the textual description on the graphical user interface.

5. A method for displaying images on a graphical user interface, comprising:

receiving a request for a web page from a user device, the web page being associated with an image and a textual description of the image;

causing the web page and textual description to be displayed on the graphical user interface;

retrieving the image; and superimposing the image over the textual description on the graphical user interface.

\* \* \* \* \*